US012755681B1

(12) United States Patent
Feng et al.

(10) Patent No.: US 12,755,681 B1
(45) Date of Patent: Oct. 6, 2026

(54) DISPLAY PANEL AND DRIVING METHOD THEREOF, AND DISPLAY DEVICE

(71) Applicant: Xiamen Tianma Display Technology Co., Ltd., Xiamen (CN)

(72) Inventors: Xuehuan Feng, Xiamen (CN); Honggang Yuan, Xiamen (CN); Bojie Yin, Xiamen (CN); Guangping Zhang, Xiamen (CN); Xingyao Zhou, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 19/296,332

(22) Filed: Aug. 11, 2025

(30) Foreign Application Priority Data

Apr. 18, 2025 (CN) ......................... 202510494425.0

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2300/0852* (2013.01); *G09G 2310/08* (2013.01); *G09G 2320/0252* (2013.01); *G09G 2320/0271* (2013.01); *G09G 2330/021* (2013.01)

(58) Field of Classification Search
CPC ...... G09G 3/3233; G09G 3/32; G09G 3/3648; G09G 3/3406; G09G 3/36; G09G 3/20; G09G 3/3611; G09G 3/3426; G09G 3/3607; G09G 3/2003; G09G 3/3275; G09G 3/3688; G09G 3/2081; G09G 3/3291; G09G 2320/0247; G09G 2320/0233; G09G 2320/0646; G09G 2320/0271; G09G 2320/0673; G09G 2320/064; G09G 2320/0626; G09G 2320/0252; G09G 2320/041; G09G 2320/066; G09G 2320/0238; G09G 2320/0285; G09G 2320/0261; G09G 2330/021; G09G 2360/16; G09G 2310/08; G09G 2310/027; G09G 2310/0251; G09G 2300/0819; G09G 2300/0861; G09G 2300/0842; G09G 2300/0852; G09G 2340/0435; G09G 2340/16
See application file for complete search history.

(56) References Cited

U.S. PATENT DOCUMENTS

2007/0126667 A1* 6/2007 Nakamura ............. G09G 3/325
345/76
2022/0059032 A1* 2/2022 Kang .................. G09G 3/3291

* cited by examiner

*Primary Examiner* — Dong Hui Liang
(74) *Attorney, Agent, or Firm* — Anova Law Group, PLLC

(57) ABSTRACT

A display panel includes a pixel circuit and a light-emitting element. The pixel circuit includes a driving module and a first energy storage module, and a driving transistor and a light-emitting element are connected in series between a first power signal terminal and a second power signal terminal to form a first series branch. During the display process of the display panel, the light-emitting element has different display grayscales, and the first energy storage module is connected to a connection node of the first series branch. When a target display grayscale value of the light-emitting element is less than a preset grayscale value, the first energy storage module is turned on, and when the target display grayscale value of the light-emitting element is greater than the preset grayscale value, the first energy storage module is turned off.

21 Claims, 22 Drawing Sheets

DISPLAY PANEL AND DRIVING METHOD THEREOF, AND DISPLAY DEVICE

CROSS-REFERENCE TO RELATED DISCLOSURE

The present application claims priority of Chinese Patent Disclosure No. 202510494425.0, filed on Apr. 18, 2025, the entire content of which is hereby incorporated by reference.

FIELD OF THE DISCLOSURE

The present application relates to the field of display technology, and in particular to a display panel, a driving method of the display panel, and a display device.

BACKGROUND

As display panels are gradually applied to various aspects of daily life, people have higher and higher requirements for the display of display panels. The display panels of the existing technology charge faster at low grayscales, resulting in a small numerical span of grayscales. A small numerical span means that the difference between adjacent grayscales is not large, so the layers do not appear clear enough and the details are not clear.

SUMMARY

The present disclosure provides a display panel, a driving method for the display panel and a display device. Under low grayscale, a first energy storage module is set to be turned on so that a part of the charge flows to the first energy storage module, thereby reducing the response speed of the light-emitting element, increasing the expansion capability of the display panel under low grayscale, and further increasing the numerical span of the grayscale under low grayscale.

In one aspect, the present disclosure provides a display panel, the display panel including a pixel circuit and a light-emitting element, where the pixel circuit includes a driving module and a first energy storage module; the driving module includes a driving transistor, the driving transistor and the light-emitting element are connected in series between a first power signal terminal and a second power signal terminal to form a first series branch, the driving transistor is configured to drive the light-emitting element to emit light, and during a display process of the display panel, the light-emitting element has different display grayscales; the first energy storage module is connected to a connection node of the first series branch; and the pixel circuit is configured as follows: when a target display grayscale value of the light-emitting element is less than a preset grayscale value, the first energy storage module is turned on, and when the target display grayscale value of the light-emitting element is greater than the preset grayscale value, the first energy storage module is turned off.

In another aspect, the present disclosure provides a method for driving a display panel, where the display panel includes a pixel circuit and a light-emitting element, the pixel circuit includes a driving module and a first energy storage module, the driving module includes a driving transistor, the driving transistor and the light-emitting element are connected in series between a first power signal terminal and a second power signal terminal to form a first series branch, the driving transistor is configured to drive the light-emitting element to emit light, during a display process of the display panel, the light-emitting element has different display grayscales, and the first energy storage module is connected to a connection node of the first series branch, and the driving method includes: when a target display grayscale value of the light-emitting element is less than a preset grayscale value, turning on the first energy storage module, and when the target display grayscale value of the light-emitting element is greater than the preset grayscale value, turning off the first energy storage module.

In another aspect, the present disclosure further provides a display device, including a display panel as described herein.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated in and constitute a part of this disclosure, illustrate embodiments consistent with the present disclosure and, together with the specification, serve to explain the principles of the present disclosure.

DETAILED DESCRIPTION

In order to make the purpose, technical solution and advantages of the present disclosure clearer, the technical solution of the present disclosure will be thoroughly described hereinafter in conjunction with the drawings in the embodiments of the present disclosure through specific embodiments. Apparently, the described embodiments are part of the embodiments of the present disclosure, not all of the embodiments. Various modifications and changes may be made in the present disclosure without departing from the spirit or scope of the present disclosure, which is obvious to those skilled in the art. Therefore, the present disclosure is intended to cover modifications and changes of the present disclosure that fall within the scope of the corresponding claims (technical solutions claimed for protection) and their equivalents.

Moreover, the words "first", "second" and similar words used in the embodiments of the present disclosure do not indicate any order, quantity or importance, but are just used to distinguish different components. Similarly, words such as "a", "an" or "the" do not indicate a quantity limitation, but indicate the existence of at least one. Words such as "include" or "comprise" and similar words mean that the elements or objects appearing before the word include the elements or objects listed after the word and their equivalents, without excluding other elements or objects. Words such as "connect" or "connected" and similar words are not limited to physical or mechanical connections, but may include electrical connections, whether direct or indirect. "Up", "down", "left", "right" and the like are just used to indicate relative positional relationships. When the absolute position of the described object changes, the relative positional relationship may also change accordingly. In addition, the descriptions of the same, equal, etc., involved in the embodiments of the present disclosure do not mean that the two objects are completely equal in size and shape, and are allowed to be roughly the same or roughly equal within a certain error range. It should be noted that the implementation methods provided in the embodiments of the present disclosure may be combined with each other without contradiction.

Figure 1:
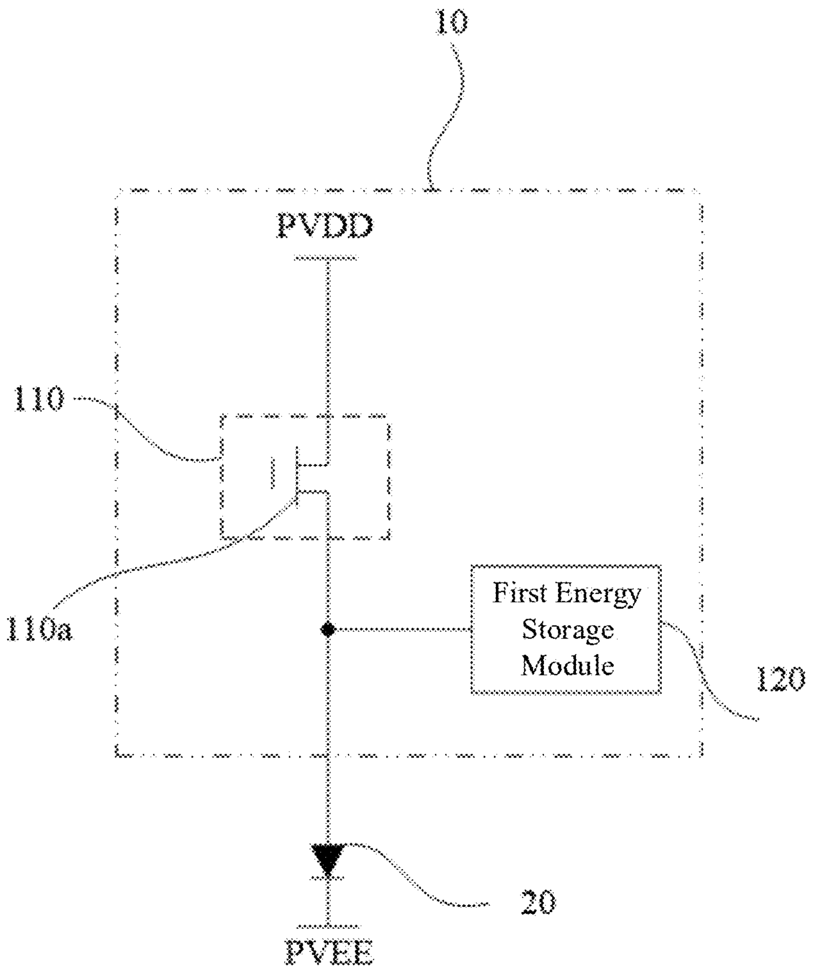
FIG. 1 is a schematic diagram of a circuit structure of a display panel, according to an embodiment of the present disclosure.

FIG. 1 is a schematic diagram of a circuit structure of a display panel, according to an embodiment of the present disclosure. Referring to FIG. 1, the display panel includes a pixel circuit 10 and a light-emitting element 20. The pixel circuit 10 includes a driving module 110 and a first energy storage module 120. The driving module 110 includes a driving transistor 110*a*, and the driving transistor 110*a* and the light-emitting element 20 are connected in series between a first power signal terminal PVDD and a second power signal terminal PVEE to form a first series branch. The driving transistor 110*a* is connected to the light-emitting element 20 to drive the light-emitting element 20 to emit light. During the display process of the display panel, the light-emitting element 20 has different display grayscales. The first energy storage module 120 is connected to any connection node of the first series branch. The pixel circuit 10 is configured as follows: when a target display grayscale value of the light-emitting element 20 is less than a preset grayscale value, the first energy storage module 120 is turned on; when the target display grayscale value of the light-emitting element 20 is greater than the preset grayscale value, the first energy storage module 120 is turned off.

Specifically, as shown in FIG. 1, the pixel circuit 10 is electrically connected to the light-emitting element 20. The pixel driving circuit 10 provides a driving signal to the light-emitting element 20 to drive the light-emitting element 20 to emit light. The display panel includes a first power signal terminal PVDD and a second power signal terminal PVEE, the first power signal terminal PVDD may be a positive power signal terminal, and the second power signal terminal PVEE may be a negative power signal terminal. The pixel circuit 10 includes a driving module 110, and the driving module 110 and the light-emitting element 20 are connected in series between the first power signal terminal PVDD and the second power signal terminal PVEE to form a first series branch. Under the action of the first power signal terminal PVDD, the driving module 110 controls the current or voltage flowing through the light-emitting element 20 according to a data signal input to the driving module 110, thereby controlling the light-emitting brightness of the light-emitting element 20, and realizing different grayscale display of the display panel. The driving module 110 includes a driving transistor 110*a*. It should be noted that the driving transistor 110*a* may be an NPN transistor or a PNP transistor, which is not limited in the present disclosure, and a person skilled in the art may set it as needed.

In addition, during the display process of the display panel, the light-emitting element 20 has different display grayscales, where the display grayscale may be understood as the brightness level of the light-emitting element 20, that is, different brightness levels from the darkest to the brightest. Exemplarily, the display grayscale of the light-emitting element 20 may be divided into low grayscale and high grayscale, where the low grayscale may correspond to a darker light-emitting brightness, and the high grayscale corresponds to a brighter light-emitting brightness. In some embodiments, the display grayscale may be represented by a numerical value, such as a display grayscale value of 0-255, where the display grayscale value of 0 indicates that the light-emitting brightness of the light-emitting element 20 is the darkest, and the display grayscale value of 255 indicates that the light-emitting brightness of the light-emitting element 20 is the brightest. At this moment, the low grayscale may be a display grayscale with a display grayscale value close to 0, and the high grayscale may be a display grayscale with a display grayscale value close to 255.

In the existing technologies, the light-emitting element 20 has the problem of fast charging speed at low grayscale. Since the driving voltage provided by the driving module to the light-emitting element at low grayscale is small and the range of the driving voltage is small, the numerical span of the grayscale at low grayscale is small, that is, the difference between adjacent grayscales is not obvious and the expansion is not sufficient, resulting in unclear layers during display and details are easily lost.

To this end, the pixel circuit 10 of the embodiment of the present disclosure further includes a first energy storage module 120, and the first energy storage module 120 is connected to any connection node of the first series branch, and is configured to store energy during the lighting process of the light-emitting element 20. In addition, when the target display grayscale value of the light-emitting element 20 is less than the preset grayscale value, the display grayscale of the light-emitting element 20 is determined to be a low grayscale. When the target display grayscale value of the light-emitting element 20 is greater than the preset grayscale value, the display grayscale of the light-emitting element 20 is determined to be a high grayscale. Here, the target display grayscale value may be understood as the display grayscale value set for the light-emitting element 20, that is, the target display grayscale value is the set luminous brightness, rather than the current luminous brightness. Exemplarily, assuming the preset grayscale value is 128, the target display grayscale value of the light-emitting element 20 is a low grayscale when in the range of 0-127, and is a high grayscale when in the range of 129-255. In this way, when the target display grayscale value of the light-emitting element 20 is set to be less than the preset grayscale value (i.e., low grayscale), the first energy storage module 120 is turned on, so that the first energy storage module 120 stores part of the charge during the lighting process of the light-emitting element 20, thereby reducing the amount of charge flowing to the light-emitting element 20, so that the response speed (i.e., charging speed) of the light-emitting element 20 is slower, so as to increase the expansion capability of the light-emitting element 20 at low grayscale, that is, increase the data span of the grayscale under the low grayscale. This then increases the difference between adjacent grayscales under low grayscale, and reduces the risk of easy loss of display details under low grayscale, thereby improving the display effect under low grayscale. In addition, since the driving voltage provided by the driving transistor 110*a* to the light-emitting element 20 is relatively large and the range of the driving voltage is relatively large under high grayscale, the faster response speed of the light-emitting element 20 has less influence on the numerical span of the grayscale under high grayscale. In other words, the difference between adjacent grayscales under high grayscale is more obvious. Therefore, when the target display grayscale value of the light-emitting element 20 is greater than the preset grayscale value (i.e., high grayscale), the first energy storage module 120 is controlled to be turned off, thereby reducing the power consumption of the display panel.

It should be noted that the lighting process of the light-emitting element 20 from non-luminescence to luminescence is a charging process, and thus the response speed mentioned above may be understood as the charging speed of the light-emitting element 20.

It should also be noted that the first series branch may include multiple connection nodes. The embodiment shown in FIG. 1 is just illustratively illustrated by taking a connection node between the driving transistor 110*a* and the light-emitting element 20 as an example, but is not limited thereto. In some embodiments, the connection node may also be located between the driving transistor 110*a* and the first power signal terminal PVDD, or may be set as needed by a person skilled in the art. It is understood that when the first series branch includes multiple connection nodes, the first energy storage module 20 may be connected to any connection node.

In summary, the embodiments of the present disclosure set the first energy storage module to be connected to any connection node of the first series branch. When the target display grayscale value of the light-emitting element is less than the preset grayscale value, the first energy storage module is controlled to be turned on, so that the first energy storage module stores part of the charge, thereby reducing the amount of charge flowing to the light-emitting element, making the response speed of the light-emitting element slower, increasing the low grayscale expansion capability of the light-emitting element, that is, increasing the numerical span of the light-emitting element at low grayscale. This makes it difficult to lose display details at low grayscale, thereby improving the display effect at low grayscale. In addition, at high grayscale, since the driving voltage provided by the driving transistor to the light-emitting element is large and the range of the driving voltage is large, the faster response speed of the light-emitting element has less effect on the numerical span of the grayscale at high grayscale. When the target display grayscale value of the light-emitting element is greater than the preset grayscale value, it is not necessary to reduce the response speed of the light-emitting element, and the first energy storage module is controlled to be turned off, thereby reducing the power consumption of the display panel.

Optionally, based on the above embodiments, referring to FIG. 1, the first energy storage module 120 is turned on, and the light-emitting element 20 is lit at a first response speed. The first energy storage module 120 is turned off, and the light-emitting element 20 is lit at a second response speed. The first response speed is less than the second response speed. Specifically, when the target display grayscale value of the light-emitting element 20 is less than the preset grayscale value, the first energy storage module 120 is turned on, and part of the charge is stored by the first energy storage module 120, thereby reducing the response speed of the light-emitting element 20, so that the light-emitting element 20 is lit at the first response speed, thereby improving the display effect of the light-emitting element 20 at low grayscale. When the target display grayscale value of the light-emitting element 20 is greater than the preset grayscale value, the first energy storage module 120 is turned off, and the charge provided by the driving transistor 110*a* flows directly to the light-emitting element 20. The response speed of the light-emitting element 20 is thus faster, so that the light-emitting element 20 is lit at the second response speed, thereby reducing the power consumption of the display panel at high grayscale.

Figure 2:
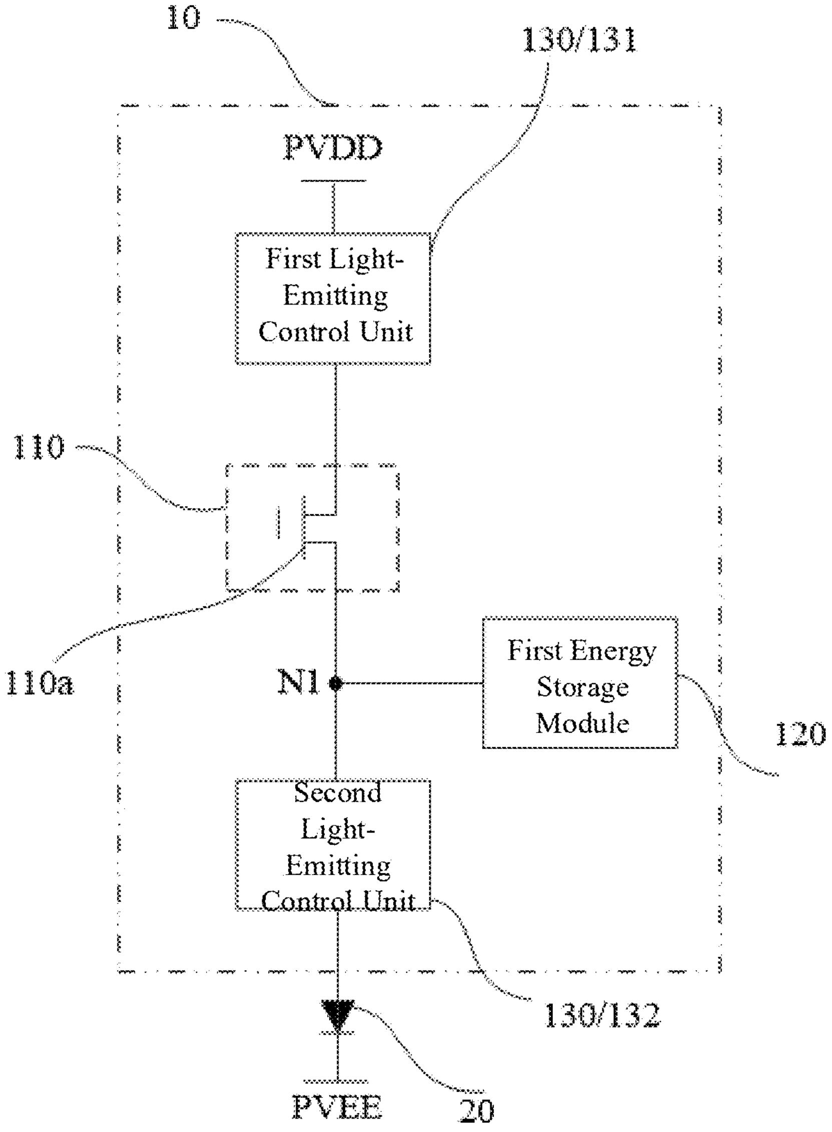
FIG. 2 is a schematic diagram of a circuit structure of another display panel, according to an embodiment of the present disclosure.
Figure 3:
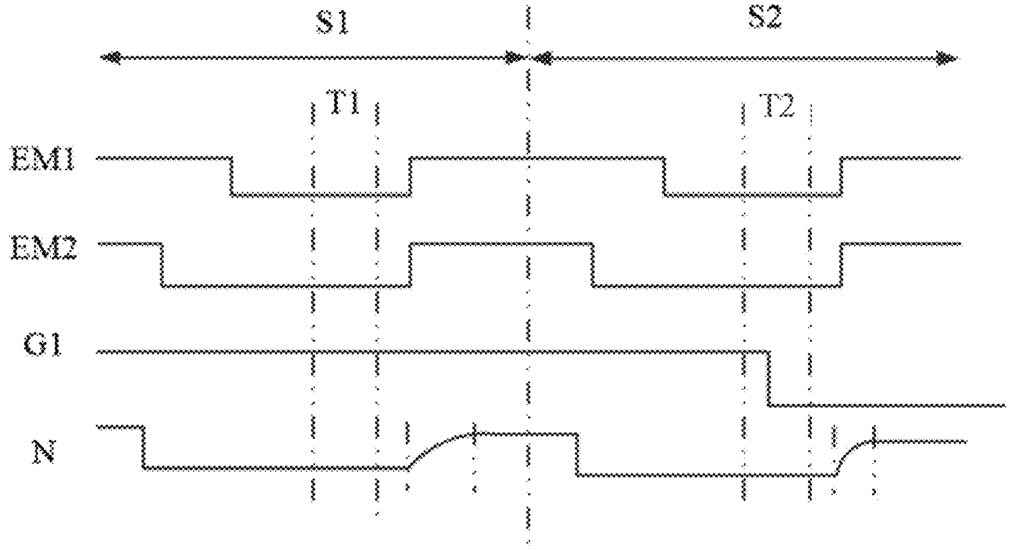
FIG. 3 is a timing diagram of a display panel, according to an embodiment of the present disclosure.

Optionally, FIG. 2 is a schematic diagram of the circuit structure of another display panel, according to an embodiment of the present disclosure, and FIG. 3 is a timing diagram of a display panel, according to an embodiment of the present disclosure. Referring to FIG. 2 and FIG. 3, the pixel circuit 10 further includes a light-emitting control module 130, and the light-emitting control module 130 is connected in series with the driving transistor 110*a* and the light-emitting element 20 between the first power signal terminal PVDD and the second power signal terminal PVEE. The display process of the display panel includes a plurality of display frames. The plurality of display frames include a first grayscale display frame S1 and a second grayscale display frame S2, and the target display grayscale value of the light-emitting element 20 in the first grayscale display frame S1 is less than the target display grayscale value of the light-emitting element 20 in the second grayscale display frame S2. The display frame includes a light-emitting stage T1. The pixel circuit is configured as follows: in the light-emitting stage T1 of the first grayscale display frame S1, the light-emitting control module 130 and the first energy storage module 120 are turned on; in the light-emitting stage T1 of the second grayscale display frame S2, the light-emitting control module 130 is turned on and the first energy storage module 120 is turned off.

Exemplarily, in the illustrated embodiment in FIGS. 2 and 3, the pixel circuit 10 also includes a light-emitting control module 130, and the display panel also includes a light-emitting control signal terminal, such as a first light-emitting control signal terminal EM1 (not shown) and a second light-emitting control signal terminal EM2 (not shown). The light-emitting control signal terminal is electrically connected to the control terminal of the light-emitting control module 130. The light-emitting control module 130 and the driving transistor 110*a* and the light-emitting element 20 are connected in series between the first power signal terminal PVDD and the second power signal terminal PVEE. The light-emitting control signal transmitted to the light-emitting control module 130 through the light-emitting control signal terminal may control the circuit between the first power signal terminal PVDD and the second power signal terminal PVEE to be turned on within a specified time period, so that the driving current of the driving transistor 110*a* flows into the light-emitting element 20. That is, the light-emitting control module 130 is configured to control the light-emitting duration of the light-emitting element 20 and ensure that the light-emitting element 20 emits light at the correct timing. In addition, the display panel may also include multiple scan signal terminals, which may include a first scan signal terminal G1 (not shown). The first scan signal terminal G1 may be electrically connected to the control terminal of the first energy storage module 120. The first scan signal provided by the first scan signal terminal G1 may be used to control the on and off of the first energy storage module 120.

Continuing to refer to FIG. 3, the display process of the display panel includes multiple display frames. The multiple display frames include a first grayscale display frame S1 and a second grayscale display frame S2, where the first grayscale display frame S1 may be a low grayscale display frame, and the second grayscale display frame S2 may be a high grayscale display frame. In addition, the display frame also includes a light-emitting stage T1, during which the light-emitting element 20 changes from non-luminous to luminous. The light-emitting stage T1 is the lighting process of the light-emitting element 20. Furthermore, either in the light-emitting stage T1 of the first grayscale display frame S1 or in the light-emitting stage T1 of the second grayscale display frame S2, it is necessary to control the light-emitting control module 130 to be turned on through the light-emitting control signal terminal so that the driving current of the driving transistor 110*a* may flow into the light-emitting element 20. On the basis of the above, in the light-emitting stage T1 of the first grayscale display frame S1, the first scan signal terminal G1 controls the first energy storage module 120 to turn on, so that the first energy storage module 120 stores part of the charge to reduce the amount of charge flowing to the light-emitting element 20. Accordingly, the response speed of the light-emitting element 20 is slower, the value span of the light-emitting element 20 at low grayscale is increased, and the expansion capacity of the light-emitting element 20 at low grayscale is improved, thereby improving the display effect at low grayscale. In the light-emitting stage T1 of the second grayscale display frame S2, the first scan signal terminal G1 controls the first energy storage module 120 to turn off, reducing the power consumption of the display panel.

It should be noted that, as shown in FIG. 3, the potential of the N node may be understood as the potential of the anode of the light-emitting element 20. After the first energy storage module 120 is turned on at a low grayscale, the time required for the anode of the light-emitting element 20 to reach the target potential at the low grayscale is longer than the time required for the anode of the light-emitting element 20 to reach the target potential at a high grayscale, that is, the response speed of the light-emitting element 20 at a low grayscale is slower and the expansion capability is stronger.

Optionally, based on the above embodiments, referring to FIG. 2 and FIG. 3, the light control module 130 includes a first light control unit 131 and a second light control unit 132. The first light control unit 131, the driving transistor 110*a*, the second light control unit 132 and the light-emitting element 20 are sequentially connected in series between the first power signal terminal PVDD and the second power signal terminal PVEE. The connection node between the driving transistor 110*a* and the second light control unit 132 is a first node N1, and the first energy storage module 120 is connected to the first node N1.

Specifically, as shown in FIG. 3, the display panel further includes a first light-emitting control signal terminal EM1 and a second light-emitting control signal terminal EM2. The first light-emitting control signal terminal EM1 is electrically connected to the control terminal of the first light-emitting control unit 131, and the second light-emitting control signal terminal EM2 is electrically connected to the control terminal of the second light-emitting control unit 132. The first light-emitting control unit 131 is thus turned on and off through the first light-emitting control signal terminal EM1, and the second light-emitting control unit 132 is turned on and off through the second light-emitting control signal terminal EM2. The first light-emitting control unit 131, the driving transistor 110*a*, the second light-emitting control unit 132, and the light-emitting element 20 are sequentially connected in series between the first power signal terminal PVDD and the second power signal terminal PVEE. Only when the first light-emitting control unit 131, the second light-emitting control unit 132, and the driving transistor 110*a* are all turned on, the driving current provided by the driving transistor 110*a* may flow into the light-emitting element 20. The connection node between the driving transistor 110*a* and the second light-emitting control unit 132 is the first node N1, and the first energy storage module 120 is connected to the first node N1. Then, at a low grayscale, by setting the first energy storage module 120 to be turned on, part of the charge of the first node N1 may be stored by the first energy storage module 120 to reduce the amount of charge flowing to the light-emitting element 20, so that the response speed of the light-emitting element 20 is slower. The numerical span of the light-emitting element 20 at a low grayscale is increased, and the expansion capability of the light-emitting element 20 at a low grayscale is improved, thereby improving the display effect of the display panel at a low grayscale.

Figure 4:
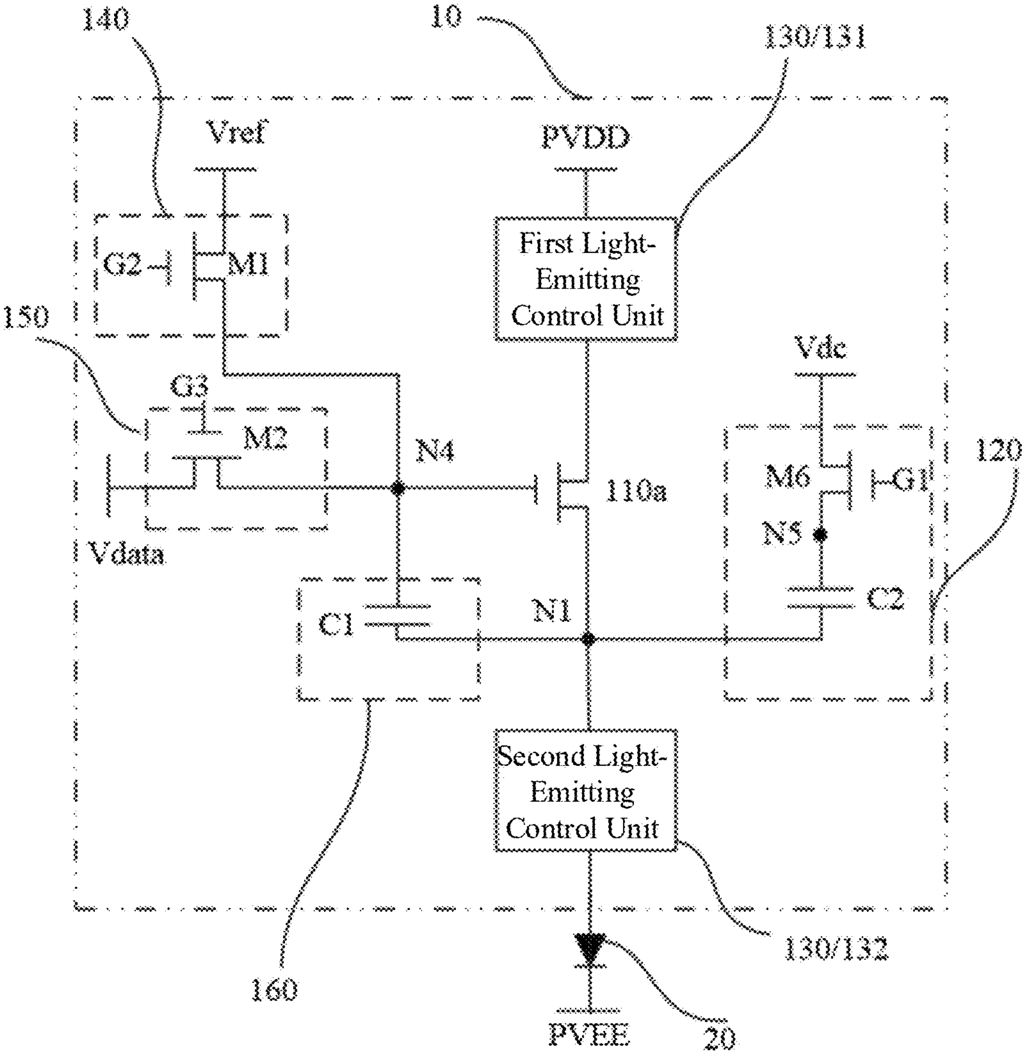
FIG. 4 is a schematic diagram of a circuit structure of another display panel, according to an embodiment of the present disclosure.
Figure 5:
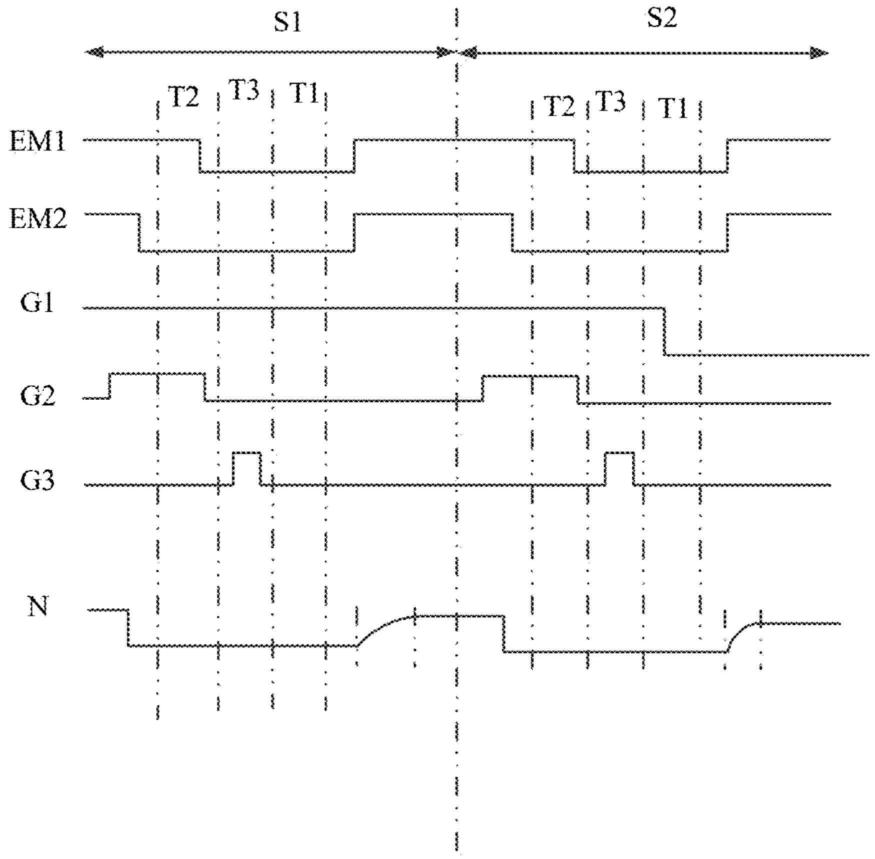
FIG. 5 is a timing diagram of another display panel, according to an embodiment of the present disclosure.

Optionally, based on the above embodiments, FIG. 4 is a schematic diagram of the circuit structure of another display panel, according to an embodiment of the present disclosure, and FIG. 5 is a timing diagram of another display panel, according to an embodiment of the present disclosure. Referring to FIG. 4 and FIG. 5, the pixel circuit 10 further includes a reset compensation module 140, a data writing module 150 and a second energy storage module 160. The reset compensation module 140 is connected between a gate reset signal terminal Vref and the gate of the driving transistor 110*a*. The data writing module 150 is connected between a data signal terminal Vdata and the gate of the driving transistor 110*a*. The second energy storage module 160 is connected between the gate of the driving transistor 110*a* and the first node N1. The display frame also includes a threshold compensation stage T2 and a data writing stage T3, where the threshold compensation stage T2 is located before the data writing stage T3, and the data writing stage T3 is located before the light-emitting stage T1. The pixel circuit 10 is configured as follows: in the threshold compensation stage T2, the reset compensation module 140, the first light-emitting control unit 131 and the first energy storage module 120 are all turned on. In the data writing stage T3, the data writing module 150 and the first energy storage module 120 are both turned on.

Specifically, as shown in FIG. 4 and FIG. 5, the reset compensation module 140 is connected between the gate reset signal terminal Vref and the gate of the driving transistor 110*a*, and the control terminal of the reset compensation module 140 is electrically connected to a second scan signal terminal G2. The reset compensation module 140 is turned on under the control of the second scan signal terminal G2, so that the gate reset signal provided by the gate reset signal terminal Vref is written to a fourth node N4 between the reset compensation module 140 and the gate of the driving transistor 110*a*, thereby resetting and threshold compensating the fourth node N4. The data writing module 150 is connected between the data signal terminal Vdata and the gate of the driving transistor 110*a*, and the control terminal of the data writing module 150 is electrically connected to a third scan signal terminal G3. The data writing module 150 is configured to be turned on under the action of the third scan signal provided by the third scan signal terminal G3, so that the data signal provided by the data signal terminal Vdata is written to the fourth node N4. The second energy storage module 160 is connected between the gate of the driving transistor 110*a* and the first node N1, and is configured to adjust the potential of the first node N1 (i.e., the potential of the source of the driving transistor 110*a*) in combination with the first energy storage module 120.

Exemplarily, as shown in FIG. 5, the first grayscale display frame S1 and the second grayscale display frame S2 both include a threshold compensation stage T2 and a data writing stage T3, and the timing of the threshold compensation stage T2 and the data writing stage T3 are identical in the two frames. Specifically, in the threshold compensation stage T2, the first light-emitting control terminal EM1 controls the first light-emitting control unit 131 to turn on, the driving transistor 110*a* to turn on, and the first node N1 is equivalent to the source of the driving transistor 110*a*. The second scan signal terminal G2 controls the reset compensation module 140 to turn on, and the gate reset signal provided by the gate reset signal terminal Vref is written to the fourth node N4, and the threshold voltage is stored through a capacitor in the second energy storage module 160. The first scan signal terminal G1 controls the first energy storage module 120 to turn on, so as to adjust the potential of the first node N1 through the coupling effect of the capacitor in the first energy storage module 120 and the coupling effect of the capacitor in the second energy storage module 160. In the data writing stage T3, the first light-emitting control terminal EM1 controls the first light-emitting control unit 131 to be turned off, and the third scan signal terminal G3 controls the data writing module 150 to be turned on, and the data signal provided by the data signal terminal Vdata is written to the fourth node N4. At this moment, since the capacitor in the second energy storage module 160 stores the threshold voltage, when the first energy storage module 120 is turned on, the threshold voltage in the voltage difference between the fourth node N4 and the first node N1 may be adaptively offset through the coupling effect of the capacitor in the first energy storage module 120 and the coupling effect of the capacitor in the second energy storage module 160. In this way, in the subsequent light-emitting stage T1, since the voltage difference between the fourth node N4 and the first node N1 is independent of the threshold voltage, the influence of the threshold voltage may be eliminated.

Optionally, based on the above embodiments, referring to FIG. 4, the reset compensation module 140 includes a first transistor M1, the data writing module 150 includes a second transistor M2, and the second energy storage module 160 includes a first capacitor C1. The first electrode of the first transistor M1 is connected to the gate reset signal terminal Vref, and the second electrode is connected to the gate of the driving transistor 110*a*. The first electrode of the second transistor M2 is connected to the data signal terminal Vdata, and the second electrode is connected to the gate of the driving transistor 110*a*. The first plate of the first capacitor C1 is connected to the gate of the driving transistor 110*a*, and the second plate is connected to the first node N1.

Specifically, in combination with FIGS. 4 and 5, the first energy storage module 120 may include a second capacitor C2 and a sixth transistor M6. The first electrode of the sixth transistor M6 is electrically connected to the first fixed potential signal terminal Vdc. A fifth node N5 is provided between the second electrode of the sixth transistor M6 and the second capacitor C2. In the threshold compensation stage T2, the second scan signal terminal G2 controls the first transistor M1 to be turned on, and the gate reset signal provided by the gate reset signal terminal Vref is written to the fourth node N4, that is, the potential of the fourth node N4 is V1. The threshold voltage Vth is stored through the first capacitor C1. The first energy storage module 120 is turned on, that is, the first fixed potential signal of the first fixed potential signal terminal Vdc is written to the fifth node N5, and the potential of the fifth node N5 is V2. The potential of the first node N1 is adjusted by the coupling effect of the first capacitor C1 and the coupling effect of the second capacitor C2, then the potential of the first node N1 is V1-Vth, the potential difference AV1 of the first capacitor C1=Vth, and the charge Q1 of the first capacitor C1 satisfies Q1=L1*Vth, where Vth is the threshold voltage, and L1 is the capacitance of the first capacitor C1. The potential difference AV2 of the second capacitor C2=V2−(V1-Vth), and the charge Q2 of the second capacitor C2 satisfies Q2=L2*[V2−(V1-Vth)], where L2 is the capacitance of the second capacitor C2.

Then, in the data writing stage T3, the third scan signal terminal G3 controls the second transistor M2 to turn on, and the data signal provided by the data signal terminal Vdata is written to the fourth node N4, that is, the potential of the fourth node N4 jumps from V1 to V3. At this moment, the potential difference AV1' of the first capacitor C1=V3-N1' (N1' is the potential of the first node N1 in the data writing stage, which is an unknown value), and the charge amount Q1' of the first capacitor C1 satisfies Q1'=L1*(V3-N1'), where L1 is the capacitance of the first capacitor C1. The potential difference AV2' of the second capacitor C2=V2-N1' (N1' is the potential of the first node N1 in the data writing stage, which is an unknown value), and the charge amount Q2' of the second capacitor C2 satisfies Q2'=L2*(V2-N1'). According to the law of charge conservation, we may obtain Q1+Q2=Q1'+Q2', and then we may calculate that N1' (i.e., the potential of the first node N1 in the data writing stage) is V1-Vth+ (V3-V1)*L1 (L1+L2). At this moment, the gate-source voltage difference Vgs of the driving transistor 110*a* is (V3-V1)*L2 (L1+L2)+Vth. Then, in the subsequent light-emitting stage T1, according to the formula of the light-emitting current: Ioled=K*(Vgs−Vth)ˆ2, where Ioled is the light-emitting current and K is a constant, it may be obtained that the coupling effect of the capacitor in the first energy storage module 120 and the coupling effect of the capacitor in the second energy storage module 160 eliminates the influence of the threshold voltage Vth.

Figure 6:
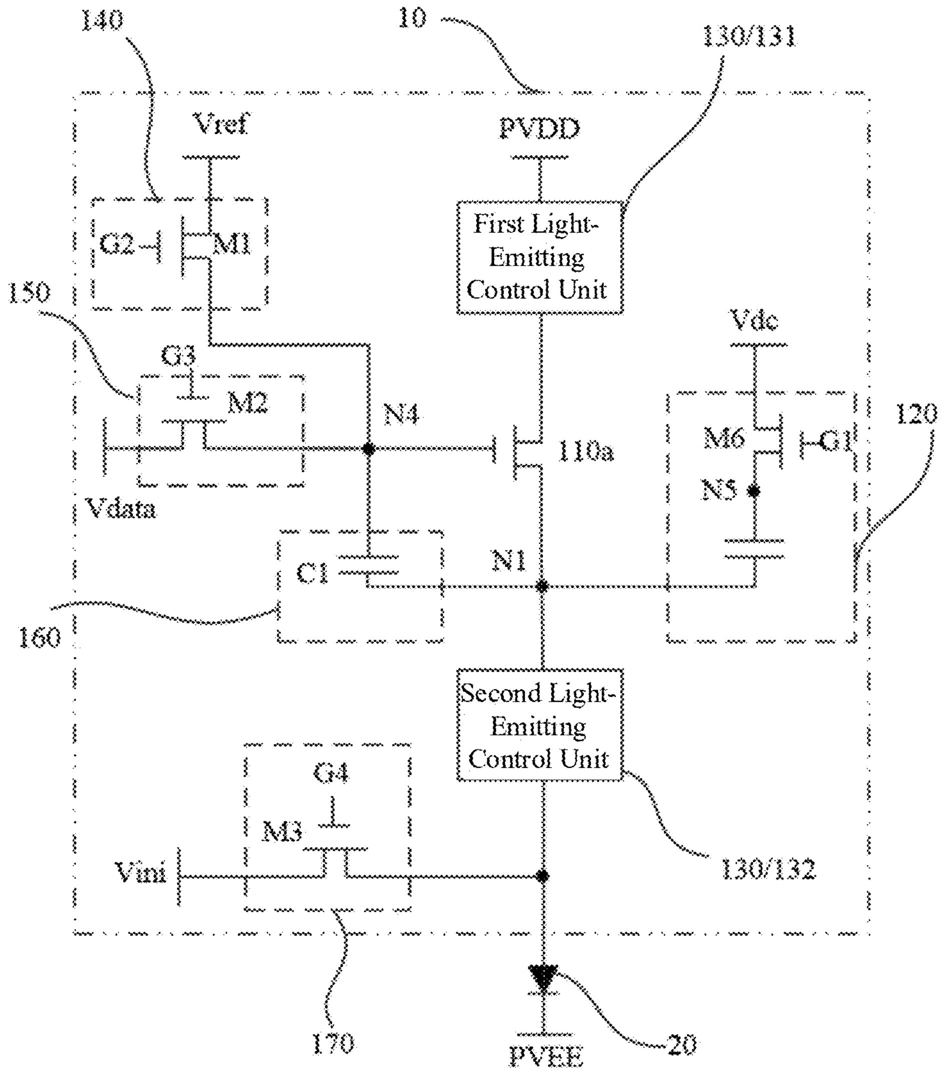
FIG. 6 is a circuit structure diagram of another display panel, according to an embodiment of the present disclosure.
Figure 7:
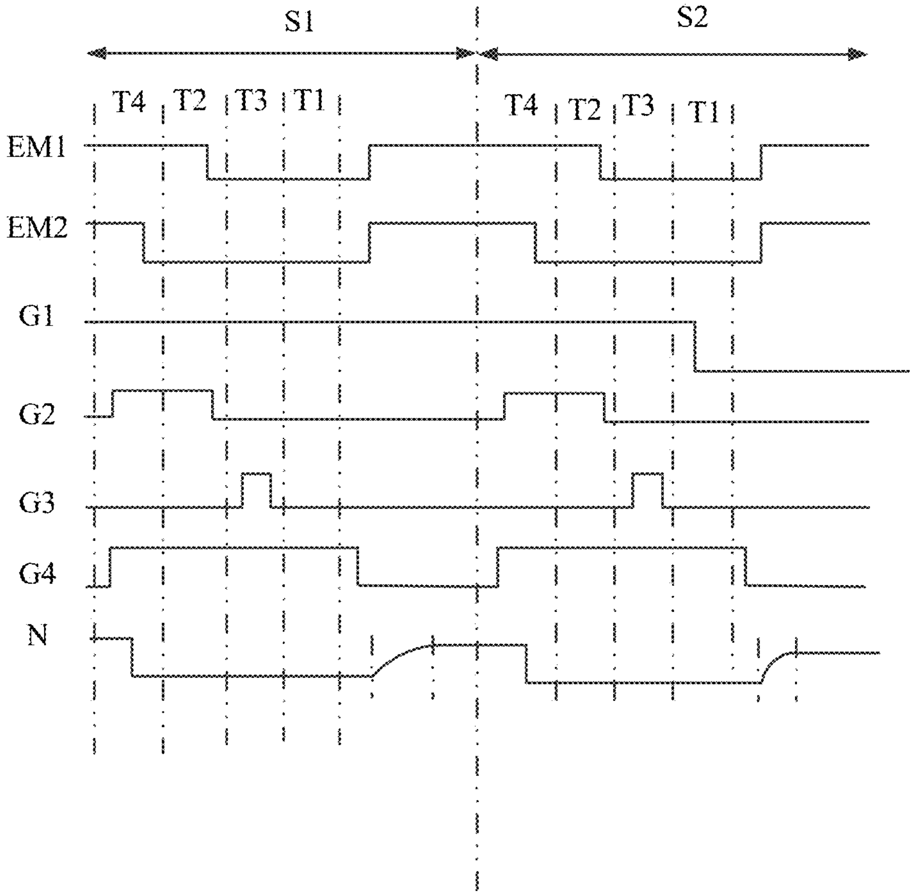
FIG. 7 is a timing diagram of another display panel, according to an embodiment of the present disclosure.

Optionally, based on the above embodiments, FIG. 6 is a circuit structure diagram of another display panel, according to an embodiment of the present disclosure, and FIG. 7 is a timing diagram of another display panel, according to an embodiment of the present disclosure. Referring to FIG. 6 and FIG. 7, the pixel circuit further includes an anode reset module 170, and the anode reset module 170 is connected between an anode reset signal terminal *Vini* and the anode of the light-emitting element 20. The display frame further includes an anode reset stage T4, and the anode reset stage T4 is located before the threshold compensation stage T2. The pixel circuit 10 is configured as follows: in the anode reset stage T4, the anode reset module 170 is turned on.

Specifically, in the embodiments shown in FIGS. 6 and 7, the anode reset module 170 is connected between the anode reset signal terminal *Vini* and the anode of the light-emitting element 20. Exemplarily, the anode reset module 170 includes a third transistor M3, the first electrode of the third transistor M3 is electrically connected to the anode reset signal terminal *Vini*, the second electrode of the third transistor M3 is electrically connected to the anode of the light-emitting element 20, and a control terminal of the third transistor M3 is electrically connected to a fourth scan signal terminal G4. Thus, the anode reset module 170 may be turned on under the control of the fourth scan signal terminal G4, so that the anode reset signal provided by the anode reset signal terminal *Vini* is written to the anode of the light-emitting element 20. Exemplarily, as shown in FIG. 7, in the anode reset stage T4, the fourth scan signal terminal G4 controls the third transistor M3 to turn on, and the first scan signal terminal G1 controls the first energy storage module 120 to turn on, so as to reset the anode of the light-emitting element 20.

Figure 8:
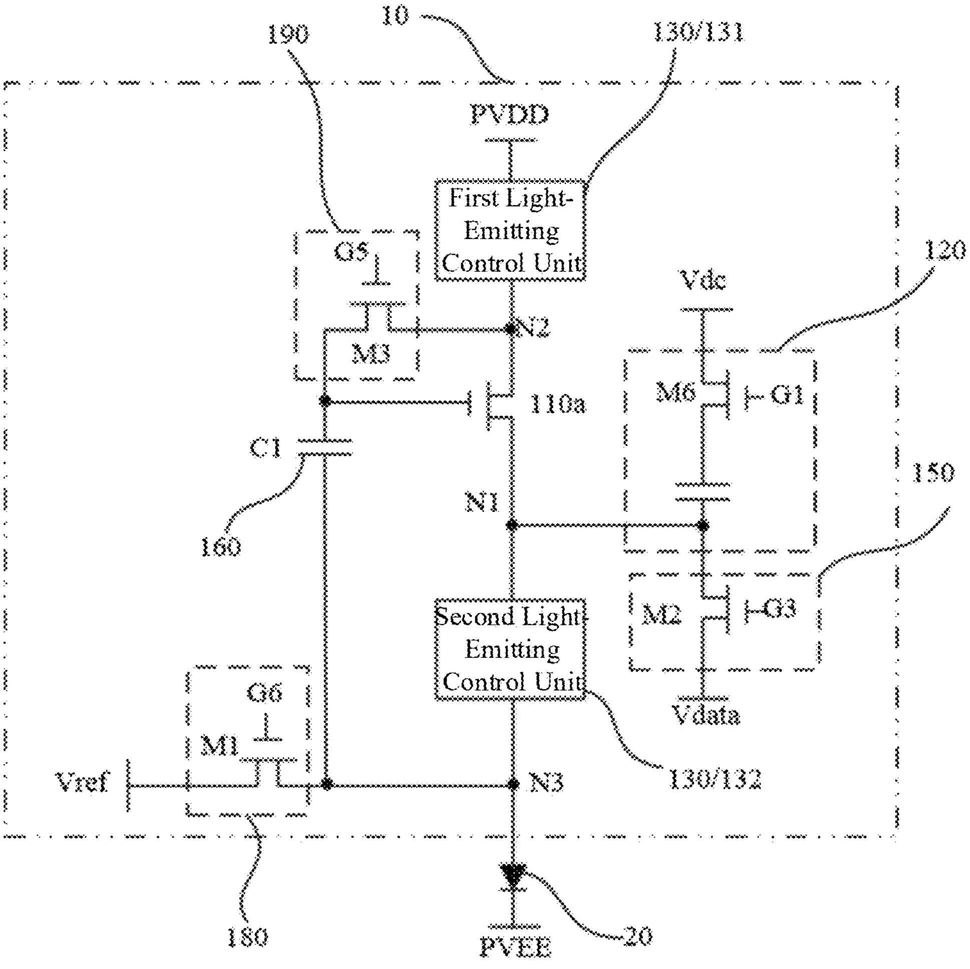
FIG. 8 is a circuit structure diagram of another display panel, according to an embodiment of the present disclosure.
Figure 9:
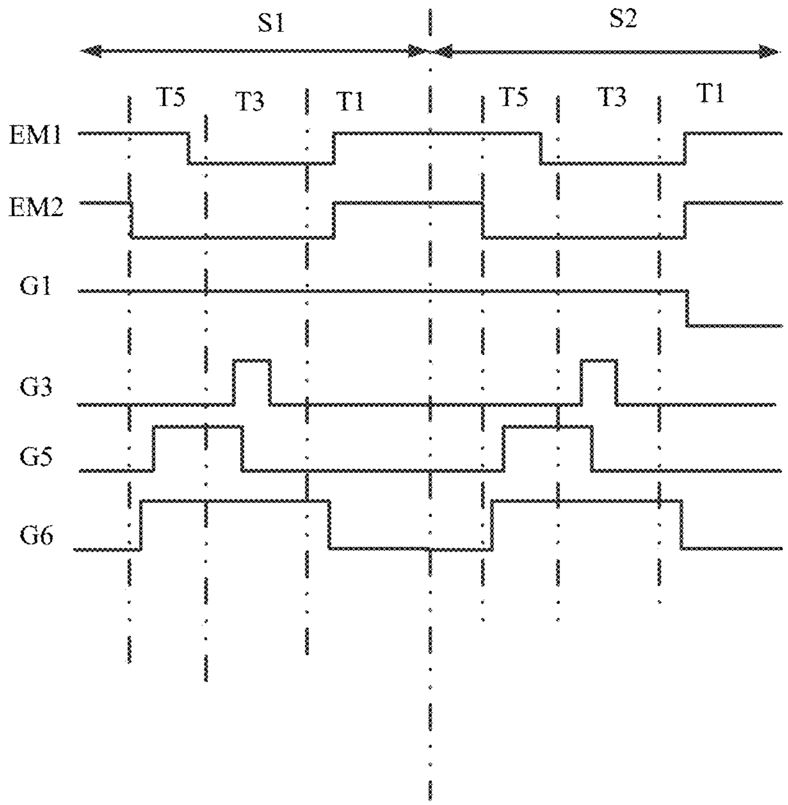
FIG. 9 is a timing diagram of another display panel, according to an embodiment of the present disclosure.

Optionally, based on the above embodiments, FIG. 8 is a circuit structure diagram of another display panel, according to an embodiment of the present disclosure, and FIG. 9 is a timing diagram of another display panel, according to an embodiment of the present disclosure. Referring to FIG. 8 and FIG. 9, the pixel circuit 10 further includes a reset module 180, a threshold compensation module 190, a data writing module 150 and a second energy storage module 160. The connection node between the first light-emitting control unit 131 and the driving transistor 110*a* is the second node N2. The connection node between the second light-emitting control unit 132 and the light-emitting element 20 is the third node N3. The threshold compensation module 190 is connected between the second node N2 and the gate of the driving transistor 110*a*. The second energy storage module 160 is connected between the gate of the driving transistor 110*a* and the third node N3, and the reset module 180 is connected between the gate reset signal terminal Vref and the third node N3. The data writing module 150 is connected between the data signal terminal Vdata and the first node N1. The display frame also includes a reset stage T5 and a data writing stage T3. The pixel circuit 10 is configured such that: in the reset stage T5, the reset module 180 is turned on; in the data writing stage T3, the data writing module 150, the threshold compensation module 190 and the reset module 180 are all turned on.

Specifically, as shown in FIGS. 8 and 9, the display panel further includes a fifth scan signal terminal G5, the fifth scan signal terminal G5 is electrically connected to the control terminal of the threshold compensation module 190, and the threshold compensation module 190 is connected between the second node N2 and the gate of the driving transistor 110*a*. The threshold compensation module 190 is turned on under the action of the fifth scan signal terminal G5, and the threshold compensation is completed. The control terminal of the data writing module 150 is electrically connected to the third scan signal terminal G3, and the data writing module 150 is connected between the data signal terminal Vdata and the first node N1. The data writing module 150 is turned on under the action of the third scan signal terminal G3, so that the data signal provided by the data signal terminal Vdata is written to the first node N1. The control terminal of the reset module 180 is electrically connected to a sixth scan signal terminal G6, and the reset module 180 is connected between the gate reset signal terminal Vref and the third node N3. Therefore, when the reset module 180 is turned on under the control of the sixth scan signal terminal G6, on one hand, the third node N3 (i.e., the anode of the light-emitting element 20) may be reset by the gate reset signal provided by the gate reset signal terminal Vref, and on the other hand, the gate of the driving transistor 110*a* may also be reset by the gate reset signal terminal Vref.

In addition, the display frame also includes a reset stage T5, a data writing stage T3 and a light-emitting stage T1. Exemplarily, in the reset stage T5, the reset module 180 is turned on under the control of the sixth scan signal terminal G6, so that the gate reset signal provided by the gate reset signal terminal Vref flows into the third node N3, thereby resetting the anode of the light-emitting element 20. The data writing stage T3 includes a threshold compensation sub-stage and a data writing sub-stage. In the threshold compensation sub-stage, the sixth scan signal terminal G6 controls the reset module 180 to be turned on, and the gate reset signal provided by the gate reset signal terminal Vref is written to the gate of the driving transistor 110*a*. The fifth scan signal terminal G5 controls the threshold compensation module 190 to be turned on, and the threshold voltage is stored through the capacitor in the second energy storage module 160, thereby completing the threshold compensation. In the data writing sub-stage, the third scan signal terminal G3 controls the data writing module 150 to be turned on, so that the data signal provided by the data signal terminal Vdata is written to the first node N1, completing the data writing. The first energy storage module 120 is connected to the first node N1. In the light-emitting stage T1 of the first grayscale display frame S1, the first scan signal terminal G1 controls the first energy storage module 120 to turn on, so that the first energy storage module 120 stores part of the charge to reduce the amount of charge flowing to the light-emitting element 20. Thus, the response speed of the light-emitting element 20 is slower, the value span of the light-emitting element 20 at low grayscale is increased, and the expansion capacity of the light-emitting element 20 at low grayscale is improved, thereby improving the display effect at low grayscale. In the light-emitting stage T1 of the second grayscale display frame S2, the first scan signal terminal G1 controls the first energy storage module 120 to turn off, reducing the power consumption of the display panel.

On the basis of the above embodiments, referring to FIG. 8 and FIG. 9, the reset module 180 includes a first transistor M1, the data writing module 150 includes a second transistor M2, the threshold compensation module 190 includes a third transistor M3, and the second energy storage module 160 includes a first capacitor C1. The first electrode of the first transistor M1 is connected to the gate reset signal terminal Vref, and the second electrode of the first transistor M1 is connected to the anode of the light-emitting element 20. The first electrode of the second transistor M2 is connected to the data signal terminal Vdata, and the second electrode of the second transistor M2 is connected to the second electrode of the driving transistor 110*a*. The first electrode of the third transistor M3 is connected to the first electrode of the driving transistor 110*a*, and the second electrode of the third transistor M3 is connected to the gate of the driving transistor 110*a*. The first plate of the first capacitor C1 is connected to the gate of the driving transistor 110*a*, and the second plate is connected to the anode of the light-emitting element 20.

Specifically, as shown in FIGS. 8 and 9, the control terminal of the first transistor M1 is electrically connected to the sixth scan signal terminal G6. In the reset stage T5, the first transistor M1 is turned on under the control of the sixth scan signal terminal G6, so that the gate reset signal provided by the gate reset signal terminal Vref flows into the third node N3, thereby resetting the anode of the light-emitting element 20. The gate of the second transistor M2 is electrically connected to the third scan signal terminal G3, and the gate of the third transistor M3 is electrically connected to the fifth scan signal terminal G5. In the data writing stage T3, the third transistor M3, the first transistor M1, and the second transistor M2 are all turned on, thereby completing the threshold compensation and data writing. The first energy storage module 120 is connected to the first node N1. In the light-emitting stage T1 of the first grayscale display frame S1, the first scan signal terminal G1 controls the first energy storage module 120 to be turned on, so that the first energy storage module 120 stores part of the charge to reduce the amount of charge flowing to the light-emitting element 20. Thus, the response speed of the light-emitting element 20 is slower, the value span of the light-emitting element 20 at low grayscale is increased, and the expansion capacity of the light-emitting element 20 at low grayscale is improved, thereby improving the display effect at low grayscale.

Figure 10:
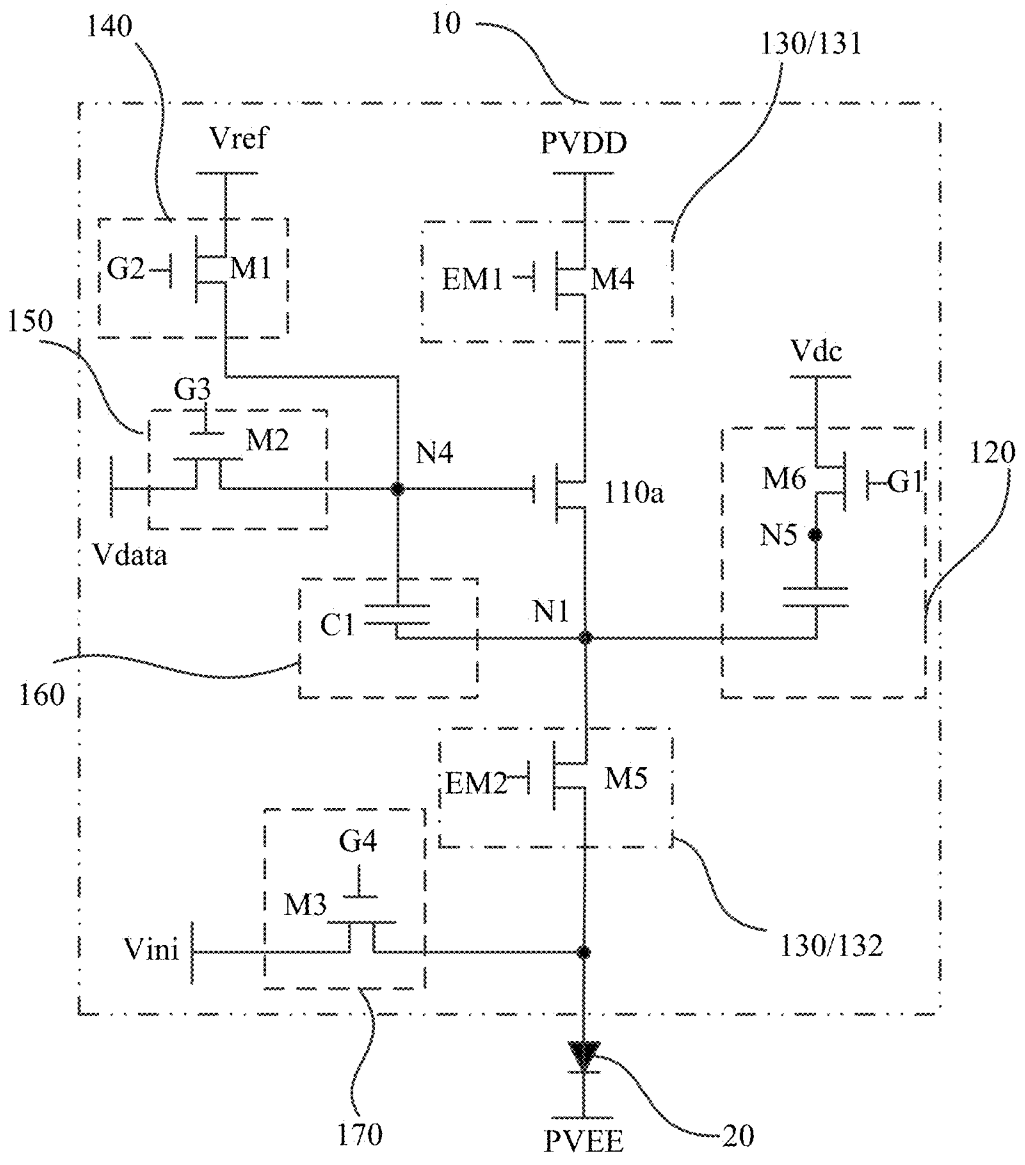
FIG. 10 is a schematic diagram of a circuit structure of another display panel, according to an embodiment of the present disclosure.

Optionally, based on the above embodiments, FIG. 10 is a schematic diagram of the circuit structure of another display panel, according to an embodiment of the present disclosure. Referring to FIG. 10, the first light-emitting control unit 131 includes a fourth transistor M4, and the second light-emitting control unit 132 includes a fifth transistor M5. The first electrode of the fourth transistor M4 is connected to the first power signal terminal PVDD, and the second electrode of the fourth transistor M4 is connected to the first electrode of the driving transistor 110*a*. The first electrode of the fifth transistor M5 is connected to the second electrode of the driving transistor 110*a*, and the second electrode of the fifth transistor M5 is connected to the anode of the light-emitting element 20. Specifically, the first light-emitting control signal terminal EM1 is electrically connected to the control terminal of the fourth transistor M4, and the second light-emitting control signal terminal EM2 is electrically connected to the control terminal of the fifth transistor M5, thereby controlling the on and off of the fourth transistor M4 through the first light-emitting control signal terminal EM1 and controlling the on and off of the fifth transistor M5 through the second light-emitting control signal terminal EM2. The driving transistor 110*a*, the fourth transistor M4 and the fifth transistor M5 are connected in series between the first power signal terminal PVDD and the second power signal terminal PVEE in sequence. Only when the fourth transistor M4, the fifth transistor M5 and the driving transistor 110*a* are all turned on, the driving current provided by the driving transistor 110*a* may flow into the anode of the light-emitting element 20.

Figure 11:
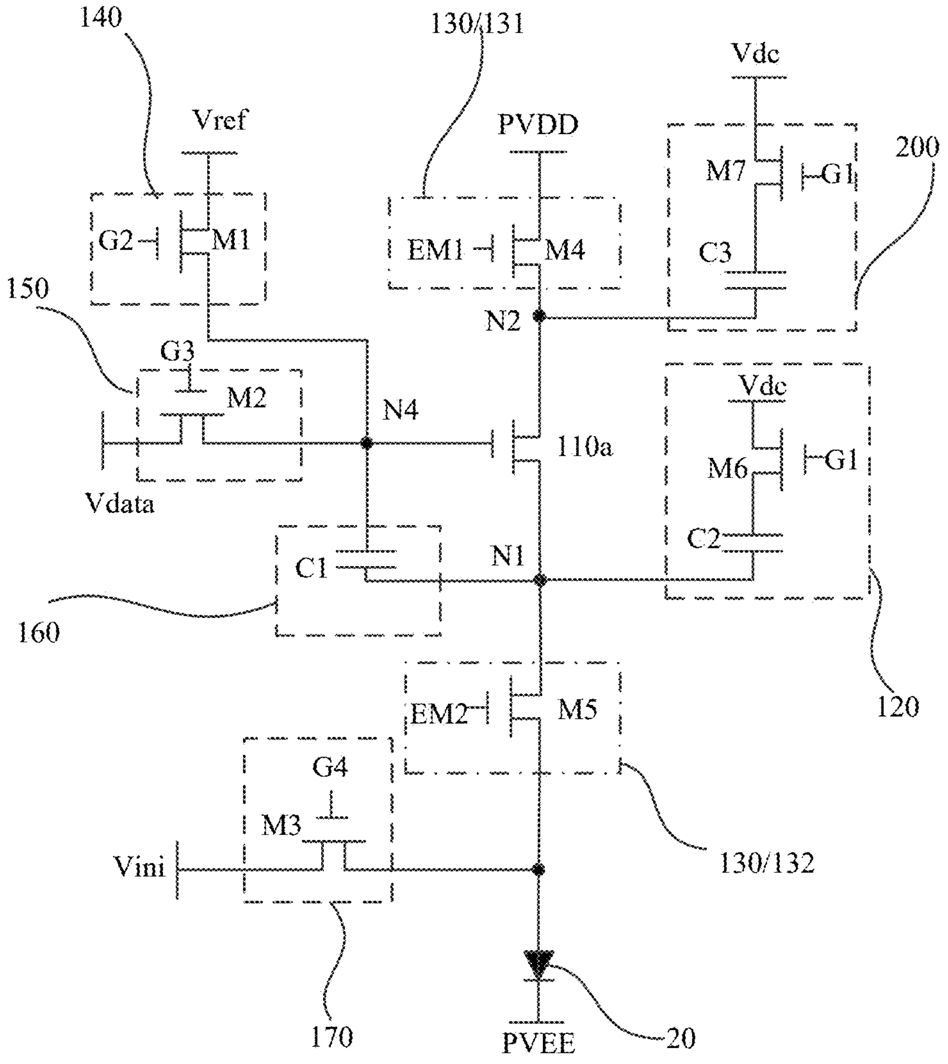
FIG. 11 is a schematic diagram of a circuit structure of another display panel, according to an embodiment of the present disclosure.

Optionally, based on the above embodiments, FIG. 11 is a schematic diagram of the circuit structure of another display panel, according to an embodiment of the present disclosure. Referring to FIG. 3 and FIG. 11, the connection node between the first light-emitting control unit 131 and the driving transistor 110*a* is the second node N2. The pixel circuit further includes a third energy storage module 200, which is connected to the second node N2. The pixel circuit is configured as follows: during the light-emitting stage T1 of the first grayscale display frame S1, the third energy storage module 200 is turned on; during the light-emitting stage T1 of the second grayscale display frame S2, the light-emitting control module 130 is turned on and the third energy storage module 200 is turned off.

Specifically, as shown in FIG. 3 and FIG. 11, the first energy storage module 120 is connected to the first node N1, and the third energy storage module 200 is connected to the second node N2. The first energy storage module 120 and the third energy storage module 200 are both configured to store energy during the lighting process of the light-emitting element 20. In the light-emitting stage T1 of the first grayscale display frame S1, the first energy storage module 120 and the third energy storage module 200 are both turned on, so that the first energy storage module 120 stores part of the charge of the first node N1, and the third energy storage module 200 stores part of the charge of the second node N2, thereby reducing the amount of charge flowing to the light-emitting element 20. Thus, the response speed of the light-emitting element 20 is further reduced, the value span of the light-emitting element 20 at low grayscale is increased, and the expansion capacity of the light-emitting element 20 at low grayscale is improved, thereby improving the display effect at low grayscale. In the light-emitting stage T1 of the second grayscale display frame S2, the first energy storage module 120 and the third energy storage module 200 are both turned off, which further reduces the power consumption of the display panel.

It should be noted that FIG. 11 and FIG. 3 are just illustrative of the case where the first energy storage module 120 and the third energy storage module 200 are controlled by a same scan signal terminal (e.g., the first scan signal terminal G1), but are not limited thereto. In some embodiments, the first energy storage module 120 and the third energy storage module 200 may also be controlled by different scan signal terminals, and those skilled in the art may set these terminals as needed.

It should also be noted that when the pixel circuit includes both the first energy storage module 120 and the third energy storage module 200, the present disclosure is just exemplified by taking the example that the first energy storage module 120 and the third energy storage module 200 are both turned on in the light-emitting stage T1 of the first grayscale display frame S1, but is not limited thereto. In some embodiments, just the third energy storage module 200 may be set to be turned on in the light-emitting stage T1 of the first grayscale display frame S1. It just needs to ensure that at least one of the first energy storage module 120 and the third energy storage module 200 is turned on in the light-emitting stage T1 of the first grayscale display frame S1.

Figure 12:
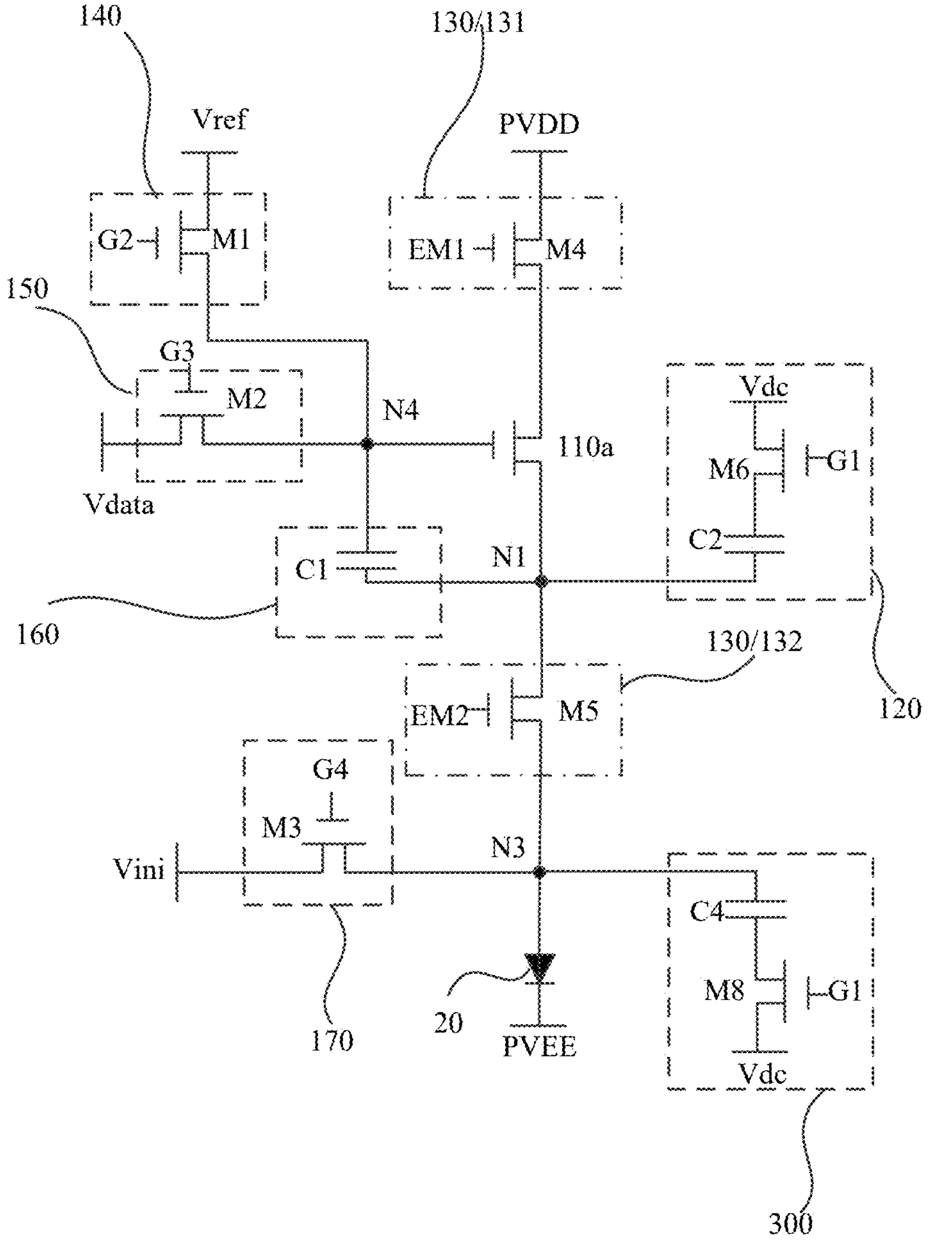
FIG. 12 is a schematic diagram of a circuit structure of another display panel, according to an embodiment of the present disclosure.

Optionally, based on the above embodiments, FIG. 12 is a schematic diagram of the circuit structure of another display panel, according to an embodiment of the present disclosure. Referring to FIG. 3 and FIG. 12, the connection node between the second light-emitting control unit 132 and the light-emitting element 20 is the third node N3. The pixel circuit also includes a fourth energy storage module 300, and the fourth energy storage module 300 is connected to the third node N3. The pixel circuit is configured as follows: in the light-emitting stage T1 of the first grayscale display frame S1, the fourth energy storage module 300 is turned on; in the light-emitting stage T1 of the second grayscale display frame S2, the light-emitting control module 130 is turned on and the fourth energy storage module 300 is turned off.

Specifically, as shown in FIG. 3 and FIG. 12, the first energy storage module 120 is connected to the first node N1, and the fourth energy storage module 300 is connected to the third node N3. The first energy storage module 120 and the fourth energy storage module 300 are both configured to store energy during the lighting process of the light-emitting element 20. In the light-emitting stage T1 of the first grayscale display frame S1, the first energy storage module 120 and the fourth energy storage module 300 are both turned on, so that the first energy storage module 120 stores part of the charge of the first node N1, and the fourth energy storage module 300 stores part of the charge of the third node N3, which reduces the amount of charge flowing to the light-emitting element 20. Thus, the response speed of the light-emitting element 20 is further reduced, the value span of the light-emitting element 20 at low grayscale is increased, and the expansion capacity of the light-emitting element 20 at low grayscale is improved, thereby improving the display effect at low grayscale. In the light-emitting stage T1 of the second grayscale display frame S2, the first energy storage module 120 and the fourth energy storage module 300 are both turned off, which further reduces the power consumption of the display panel.

It should be noted that FIG. 3 and FIG. 12 are just illustrative of the case where the first energy storage module 120 and the fourth energy storage module 300 are controlled by the same scan signal terminal (e.g., the first scan signal terminal G1), but are not limited thereto. In some embodiments, the first energy storage module 120 and the fourth energy storage module 300 may also be controlled by different scan signal terminals, and those skilled in the art may set these terminals as needed.

It should also be noted that when the pixel circuit includes both the first energy storage module 120 and the fourth energy storage module 300, the present disclosure is just exemplified by taking the example that the first energy storage module 120 and the fourth energy storage module 300 are both turned on in the light-emitting stage T1 of the first grayscale display frame S1, but is not limited thereto. In some embodiments, just the fourth energy storage module 300 may be set to be turned on in the light-emitting stage T1 of the first grayscale display frame S1. It is just necessary to ensure that at least one of the first energy storage module 120 and the fourth energy storage module 300 is turned on in the light-emitting stage T1 of the first grayscale display frame S1.

Figure 13:
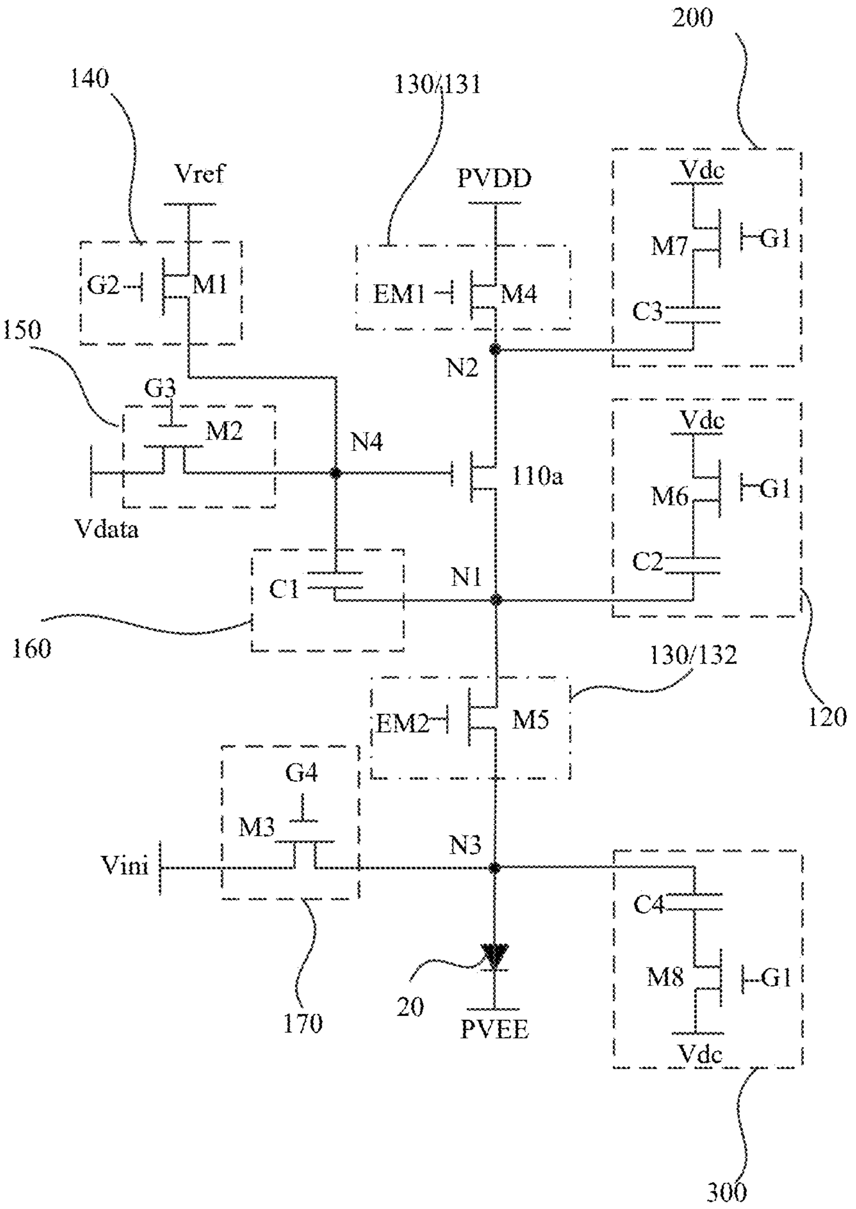
FIG. 13 is a schematic diagram of a circuit structure of another display panel, according to an embodiment of the present disclosure.

Optionally, based on the above embodiments, FIG. 13 is a schematic diagram of the circuit structure of another display panel, according to an embodiment of the present disclosure. Referring to FIG. 3 and FIG. 13, the connection node between the first light-emitting control unit 131 and the driving transistor **110*a* is the second node N2. The connection node between the second light-emitting control unit 132 and the light-emitting element 20 is the third node N3. The pixel circuit includes a third energy storage module 200 and a fourth energy storage module 300, the third energy storage module 200 is connected to the second node N2, and the fourth energy storage module 300 is connected to the third node N3. The pixel circuit is configured as follows: in the light-emitting stage T1 of the first grayscale display frame S1, the third energy storage module 200 and the fourth energy storage module 300 are turned on; in the light-emitting stage T1 of the second grayscale display frame S2, the light-emitting control module 130 is turned on, and the third energy storage module 200 and the fourth energy storage module 300** are turned off.

Specifically, as shown in FIG. 3 and FIG. 13, the first energy storage module 120 is connected to the first node N1, the third energy storage module 200 is connected to the second node N2, and the fourth energy storage module 300 is connected to the third node N3. The first energy storage module 120, the third energy storage module 200, and the fourth energy storage module 300 are all configured to store energy during the lighting process of the light-emitting element 20. In the light-emitting stage T1 of the first grayscale display frame S1, the first energy storage module 120, the third energy storage module 200, and the fourth energy storage module 300 are all turned on, so that the first energy storage module 120 stores part of the charge of the first node N1, the third energy storage module 200 stores part of the charge of the second node N2, and the fourth energy storage module 300 stores part of the charge of the third node N3. This further reduces the amount of charge flowing to the light-emitting element 20, makes the response speed of the light-emitting element 20 slower, increases the value span of the light-emitting element 20 at low grayscale, and improves the expansion capacity of the light-emitting element 20 at low grayscale, thereby improving the display effect at low grayscale. In the light-emitting stage T1 of the second grayscale display frame S2, the first energy storage module 120, the third energy storage module 200 and the fourth energy storage module 300 are all turned off, thereby further reducing the power consumption of the display panel.

It should be noted that FIG. 11 and FIG. 3 are just illustrative of the case where the first energy storage module 120, the third energy storage module 200 and the fourth energy storage module 300 are all controlled by the same scan signal terminal (e.g., the first scan signal terminal G1), but this is not a limitation. In some embodiments, the first energy storage module 120, the third energy storage module 200 and the fourth energy storage module 300 may also be controlled by different scan signal terminals, and those skilled in the art may set these terminals as needed.

It should also be noted that when the pixel circuit includes the first energy storage module 120, the third energy storage module 200 and the fourth energy storage module 300 at the same time, the present disclosure is just exemplified by taking the example that the first energy storage module 120, the third energy storage module 200 and the fourth energy storage module 300 are all turned on in the light-emitting stage T1 of the first grayscale display frame S1, but is not limited thereto. In some embodiments, the third energy storage module 200 and the fourth energy storage module 300 may also be set to be turned on in the light-emitting stage T1 of the first grayscale display frame S1, or the first energy storage module 120 and the fourth energy storage module 300 are turned on in the light-emitting stage T1 of the first grayscale display frame S1, and so on. That is, it is just necessary to ensure that at least one of the first energy storage module 120, the third energy storage module 200 and the fourth energy storage module 300 is turned on in the light-emitting stage T1 of the first grayscale display frame S1.

Optionally, based on the above embodiments, referring to FIG. 13, the first energy storage module 120, the third energy storage module 200 and the fourth energy storage module 300 all include capacitors and switching transistors. A capacitor and a switching transistor are connected in series to form a second series branch, and the two ends of the second series branch are respectively connected to a first fixed potential signal terminal Vdc and a connection node of the first series branch.

For example, in the embodiment shown in FIG. 13, the first energy storage module 120 may include a second capacitor C2 and a sixth transistor M6, the third energy storage module 200 may include a third capacitor C3 and a seventh transistor M7, and the fourth energy storage module 300 may include a fourth capacitor C4 and an eighth transistor M8. The capacitors and the switch transistors are connected in series to form a plurality of second series branches. The connection nodes of the first series branche include a first node N1, a second node N2, and a third node N3. For example, a second series branch formed by the second capacitor C2 and the sixth transistor M6 is connected between the first fixed potential signal terminal Vdc and the first node N1, a second series branch formed by the third capacitor C3 and the seventh transistor M7 is connected between the first fixed potential signal terminal Vdc and the second node N2, and a second series branch formed by the fourth capacitor C4 and the eighth transistor M8 is connected between the first fixed potential signal terminal Vdc and the third node N3. In this way, by setting the capacitor and the switching transistor in series to form a second series branch connected between the first fixed potential signal terminal Vdc and a connection node of the first series branch, it is ensured that the switching transistor may control the corresponding capacitor to store part of the charge in the light-emitting stage T1 of the first grayscale display frame S1, thereby achieving the effect of reducing the response speed of the light-emitting element 20 at a low grayscale.

Figure 14:
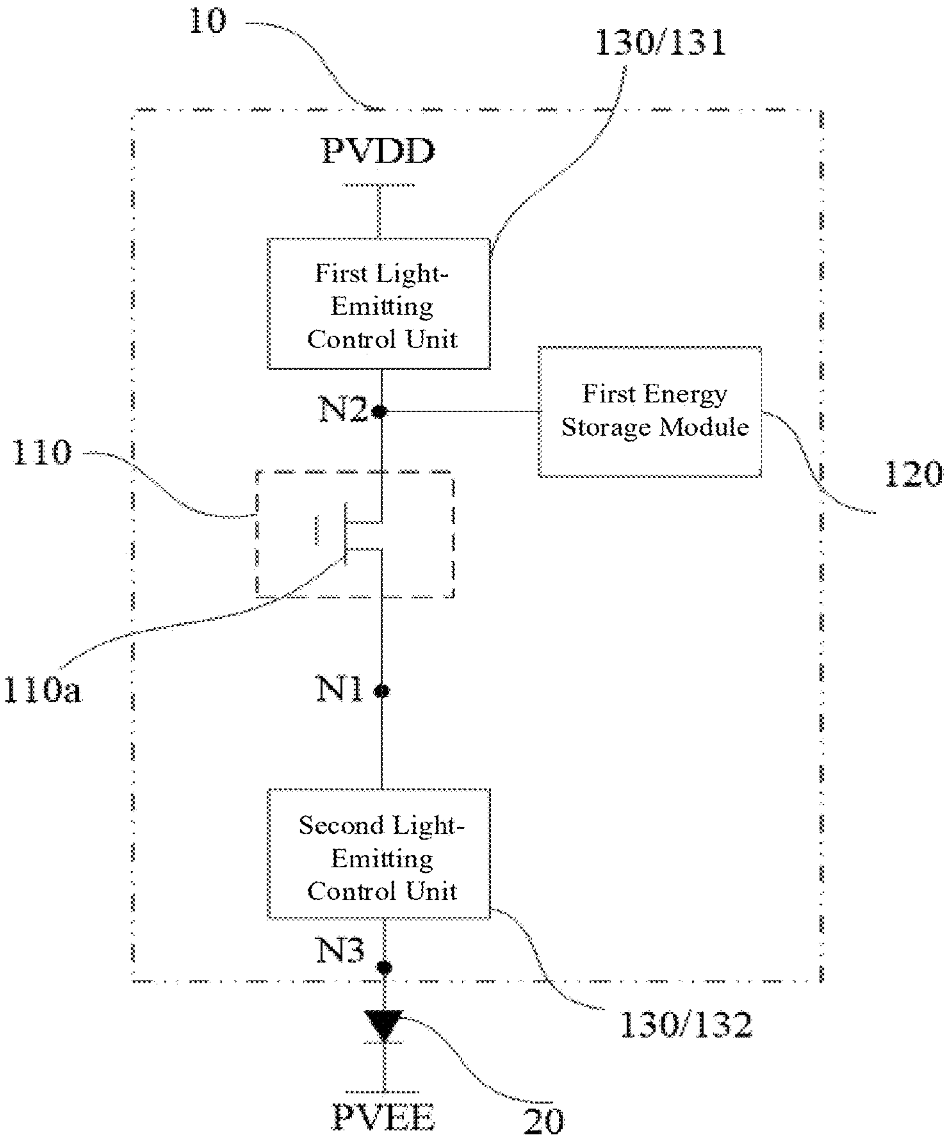
FIG. 14 is a schematic diagram of a circuit structure of another display panel, according to an embodiment of the present disclosure.

Optionally, based on the above embodiments, FIG. 14 is a circuit structure diagram of another display panel, according to an embodiment of the present disclosure. Referring to FIG. 14, the connection node between the first light-emitting control unit 131 and the driving transistor 110*a* is the second node N2, and the first energy storage module 120 is connected to the second node N2.

Exemplarily, in the embodiment shown in FIG. 14, the first light-emitting control unit 131, the driving transistor 110*a*, the second light-emitting control unit 132 and the light-emitting element 20 are sequentially connected in series between the first power signal terminal PVDD and the second power signal terminal PVEE. Then, when the first light-emitting control unit 131, the second light-emitting control unit 132 and the driving transistor 110*a* are all turned on, the driving current provided by the driving transistor 110*a* may flow into the light-emitting element 20. On this basis, the first energy storage module 120 is electrically connected to the second node N2 between the first light-emitting control unit 131 and the driving transistor 110*a*. At low grayscale, by setting the first energy storage module 120 to be turned on, the first energy storage module 120 may store part of the charge of the second node N2 to reduce the amount of charge flowing to the light-emitting element 20, so that the response speed of the light-emitting element 20 is slow, the value span of the light-emitting element 20 at low grayscale is increased, and the expansion capability of the light-emitting element 20 at low grayscale is improved, thereby improving the display effect of the display panel at low grayscale.

Figure 15:
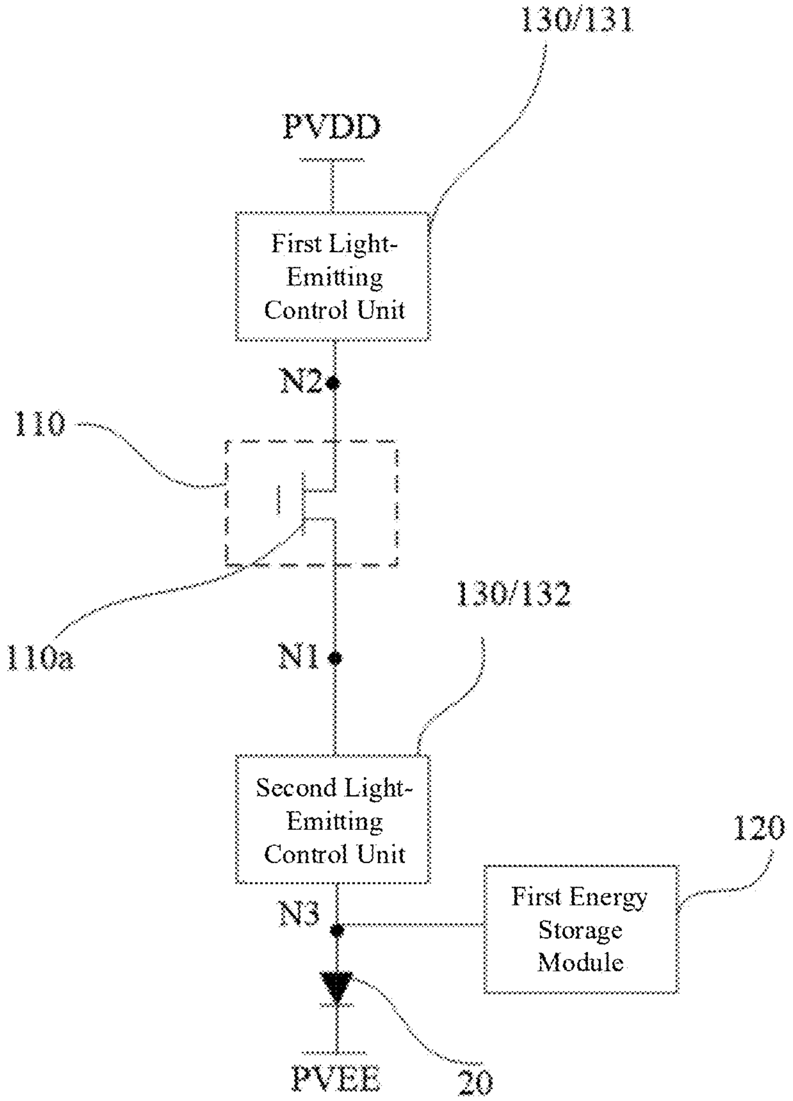
FIG. 15 is a schematic diagram of a circuit structure of another display panel, according to an embodiment of the present disclosure.

FIG. 15 is a circuit structure diagram of another display panel, according to an embodiment of the present disclosure. Referring to FIG. 15, the connection node between the second light-emitting control unit 132 and the driving transistor 110*a* is the third node N3, and the first energy storage module 120 is connected to the third node N3.

Exemplarily, in the embodiment shown in FIG. 15, the first light-emitting control unit 131, the driving transistor 110*a*, the second light-emitting control unit 132 and the light-emitting element 20 are sequentially connected in series between the first power signal terminal PVDD and the second power signal terminal PVEE. Then, when the first light-emitting control unit 131, the second light-emitting control unit 132 and the driving transistor 110*a* are all turned on, the driving current provided by the driving transistor 110*a* may flow into the light-emitting element 20. On this basis, the first energy storage module 120 is electrically connected to the third node N3 between the second light-emitting control unit 132 and the driving transistor 110*a*. At low grayscale, by setting the first energy storage module 120 to be turned on, the first energy storage module 120 may store part of the charge of the third node N3 to reduce the amount of charge flowing to the light-emitting element 20, so that the response speed of the light-emitting element 20 is slow, the value span of the light-emitting element 20 in low grayscale is increased, and the expansion capability of the light-emitting element 20 in low grayscale is improved, thereby improving the display effect of the display panel in low grayscale.

Figure 16:
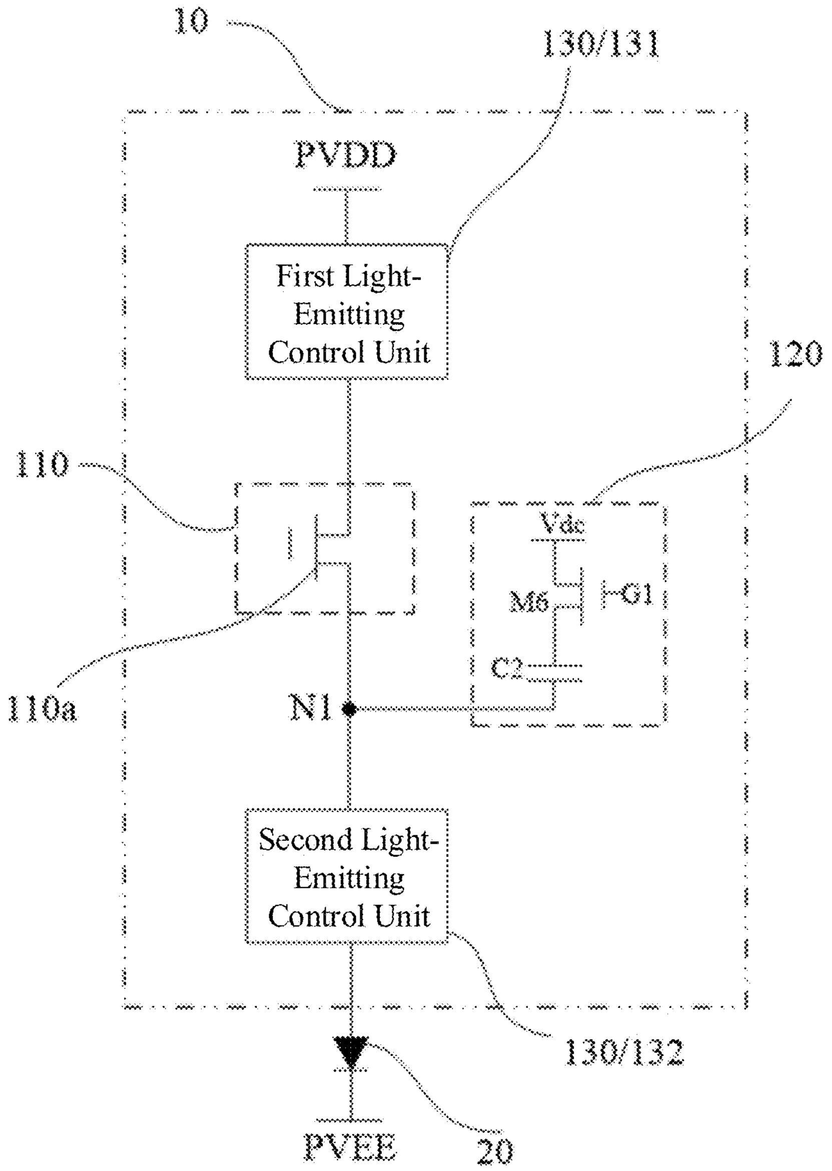
FIG. 16 is a schematic diagram of a circuit structure of another display panel, according to an embodiment of the present disclosure.

Optionally, based on the above embodiments, FIG. 16 is a schematic diagram of the circuit structure of another display panel, according to an embodiment of the present disclosure. Referring to FIG. 16, the first energy storage module 120 includes a second capacitor C2 and a sixth transistor M6. The first electrode of the second capacitor C2 is connected to the connection node between the driving transistor 110*a* and the light-emitting element 20, the second electrode is connected to the first electrode of the sixth transistor M6, and the second electrode of the sixth transistor M6 is connected to the first fixed potential signal terminal Vdc. The sixth transistor M6 is configured to turn on when the target display grayscale value of the light-emitting element 20 is less than the preset grayscale value, and to turn off when the target display grayscale value of the light-emitting element 20 is greater than the preset grayscale value.

Exemplarily, in the embodiment shown in FIG. 16, the first energy storage module 120 is connected to the first node N1, and the second capacitor C2 is arranged in series between the first node N1 and the sixth transistor M6, thereby ensuring that when the sixth transistor M6 is turned on, the second capacitor C2 may store part of the charge in the first node N1, thereby reducing the response speed of the light-emitting element 20 at a low grayscale. This ensures that when the sixth transistor M6 is turned off, the series branch formed by the first energy storage module 120 is disconnected, so that the response speed of the light-emitting element 20 at a high grayscale is normal.

Figure 17:
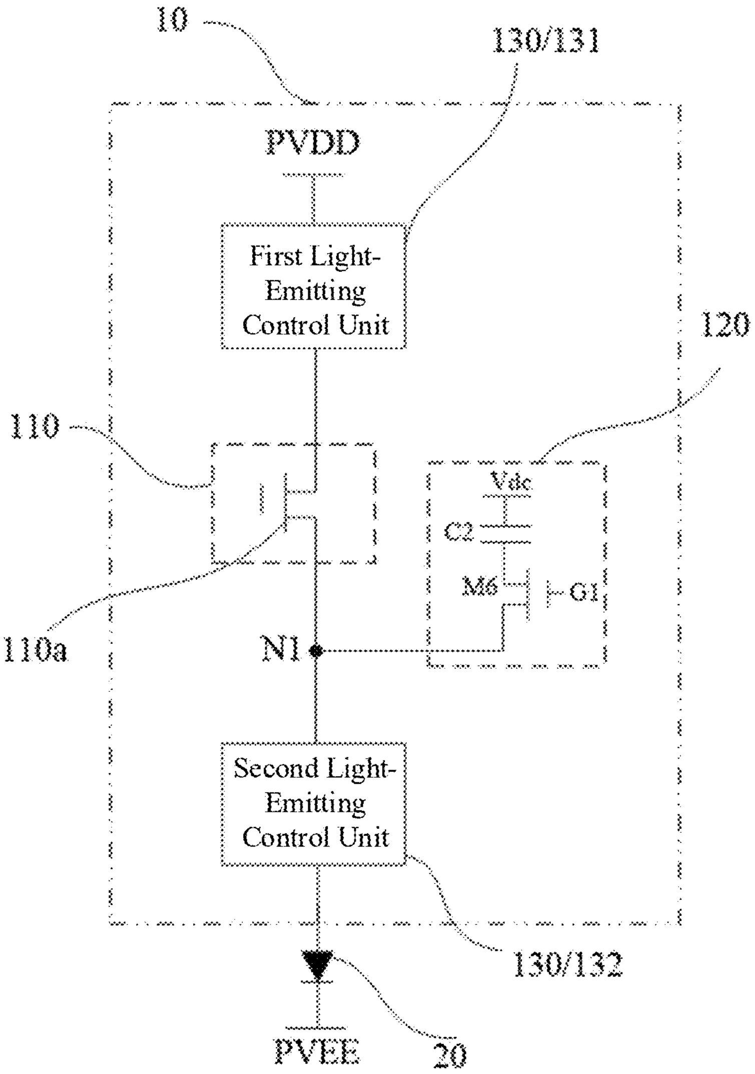
FIG. 17 is a schematic diagram of a circuit structure of another display panel, according to an embodiment of the present disclosure.

It should be noted that FIG. 16 is just illustrative of the example in which the second capacitor C2 is arranged in series between the first node N1 and the sixth transistor M6, but is not limited thereto. In some embodiments, FIG. 17 is a circuit structure diagram of another display panel, according to an embodiment of the present disclosure. As shown in FIG. 17, the first electrode of the sixth transistor M6 is connected to the connection node between the driving transistor 110*a* and the light-emitting element 20, the second electrode is connected to the first plate of the second capacitor C2, and the second plate of the second capacitor C2 is connected to the first fixed potential signal terminal Vdc. That is, the second capacitor C2 may also be arranged in series between the first fixed potential signal terminal Vdc and the sixth transistor M6, and a person skilled in the art may set it as needed.

Figure 18:
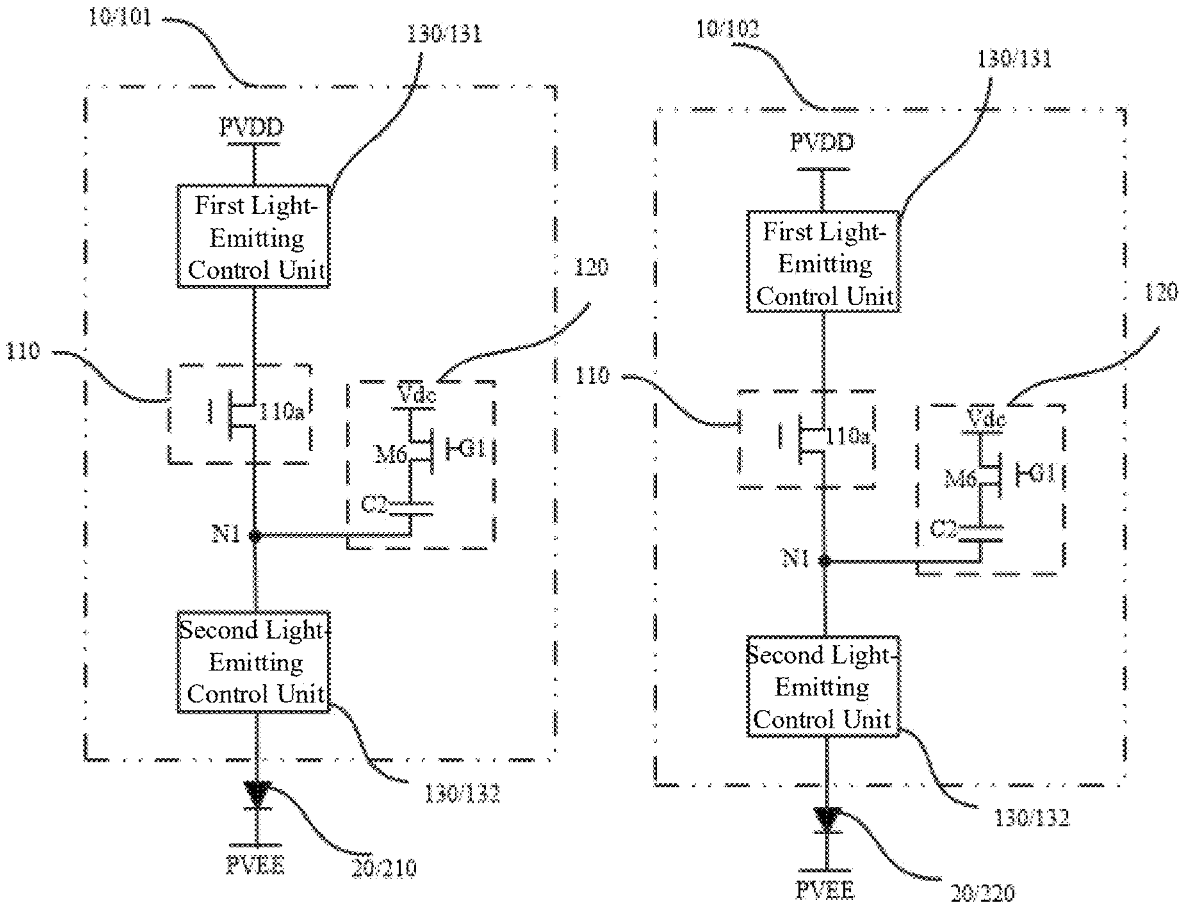
FIG. 18 is a schematic diagram of a circuit structure of another display panel, according to an embodiment of the present disclosure.

Optionally, based on the above embodiments, FIG. 18 is a schematic diagram of the circuit structure of another display panel, according to an embodiment of the present disclosure. Referring to FIG. 18, the pixel circuit 10 includes a first pixel circuit 101 and a second pixel circuit 102. The light-emitting element 20 includes a first light-emitting element 210 and a second light-emitting element 220. The first pixel circuit 101 is connected to the first light-emitting element 210, and the second pixel circuit 110 is connected to the second light-emitting element 220. The light-emitting color of the first light-emitting element 210 is different from the light-emitting color of the second light-emitting element 220, and the capacitance value of the second capacitor C2 in the first pixel circuit 101 is different from the capacitance value of the second capacitor C2 in the second pixel circuit 102.

Specifically, the first light-emitting element 210 and the second light-emitting element 220 have different luminous colors, that is, the capacitance value of the first light-emitting element 210 itself (i.e., self-capacitance value) is different from the capacitance value of the second light-emitting element 220 itself (i.e., self-capacitance value). The difference in self-capacitance values results in different response speeds of the light-emitting element 20 when it is lit. For example, the light-emitting element 20 with a larger self-capacitance value has a slower response speed when it is lit, and the light-emitting element 20 with a smaller self-capacitance value has a faster response speed when it is lit. As a result, when the brightness of the light-emitting element 20 with a smaller self-capacitance value reaches a preset target value, the brightness of the light-emitting element 20 with a larger self-capacitance value does not reach the preset target value, that is, the luminous color of the light-emitting element 20 with a larger self-capacitance value lags behind the luminous color of the light-emitting element 20 with a smaller self-capacitance value, resulting in color separation and the formation of a drag. For example, when a white object is shown moving quickly, a blue/red tint may be seen on the edge of the object (depending on which light-emitting element 20 has a slow response speed).

The capacitance value of the second capacitor C2 in the first energy storage module 120 affects the degree of adjustment of the response speed of the light-emitting element 20 by the first energy storage module 120. For example, if the capacitance value of the second capacitor C2 in the first energy storage module 120 is larger, the first energy storage module 120 may store more charge, so that the degree of reduction in the response speed of the light-emitting element 20 is larger. If the capacitance value of the second capacitor C2 in the first energy storage module 120 is smaller, the first energy storage module 120 may store less charge, so that the degree of reduction in the response speed of the light-emitting element 20 is smaller. Furthermore, in the embodiments of the present disclosure, on the basis of setting the first energy storage module 120 to adjust the response speed of the light-emitting element 20, the capacitance value of the capacitor in the first energy storage module 120 of the first pixel circuit 101 is different from that of the capacitor in the first energy storage module 120 of the second pixel circuit 102. That is, the light-emitting element 20 with a larger self-capacitance value reduces the response speed at a smaller degree through the second capacitor C2 with a smaller capacitance value, and the light-emitting element 20 with a smaller self-capacitance value reduces the response speed at a larger degree through the second capacitor C2 with a larger capacitance value, thereby reducing the difference in response speed between the first light-emitting element 210 and the second light-emitting element 220, ameliorating the ghosting phenomenon, and enhancing the display effect of the display panel.

On the basis of the above embodiments, continuing to refer to 18, the self-capacitance of the first light-emitting element 210 is greater than the self-capacitance of the second light-emitting element 220. The capacitance of the second capacitor C2 in the first pixel circuit 101 is less than the capacitance of the second capacitor C2 in the second pixel circuit 102.

Specifically, the self-capacitance value of the first light-emitting element 210 is greater than the self-capacitance value of the second light-emitting element 220, that is, the response speed of the first light-emitting element 210 when lit is slower, and the response speed of the second light-emitting element 220 when lit is faster. Accordingly, the capacitance value of the second capacitor C2 in the first energy storage module 120 of the first pixel circuit 101 is set to be smaller than the capacitance value of the second capacitor C2 in the first energy storage module 120 in the second pixel circuit 102. In other words, the first light-emitting element 210 with a slower response speed reduces the response speed at a smaller degree through the second capacitor C2 with a smaller capacitance value, and the second light-emitting element 220 with a faster response speed reduces the response speed at a larger degree through the second capacitor C2 with a larger capacitance value, thereby reducing the difference in response speed between the first light-emitting element 210 and the second light-emitting element 220, ameliorating the ghosting phenomenon, and enhancing the display effect of the display panel.

Figure 19:
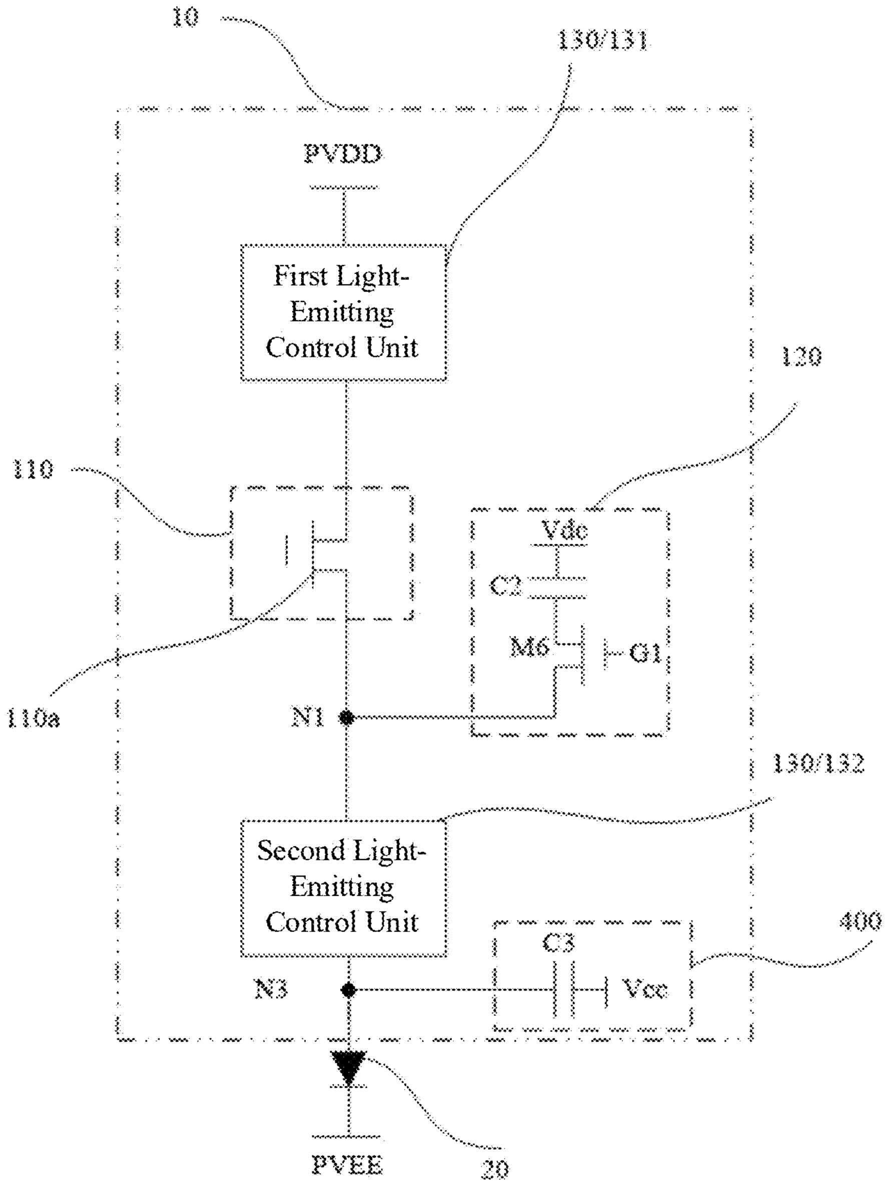
FIG. 19 is a schematic diagram of a circuit structure of another display panel, according to an embodiment of the present disclosure.

Optionally, based on the above embodiments, FIG. 19 is a schematic diagram of a circuit structure of another display panel, according to an embodiment of the present disclosure. Referring to FIG. 19, the pixel circuit 10 further includes a fifth energy storage module 400, and the fifth energy storage module 400 is connected to the connection node between the driving transistor 110*a* and the light-emitting element 20. The fifth energy storage module 400 is normally on and is configured to store energy during the lighting process of the light-emitting element 20.

Exemplarily, in the embodiment shown in FIG. 19, the first light-emitting control unit 131, the driving transistor 110*a*, the second light-emitting control unit 132 and the light-emitting element 20 are sequentially connected in series between the first power signal terminal PVDD and the second power signal terminal PVEE. Here, the connection node of the driving transistor 110*a* and the second light-emitting control unit 132 is the first node N1, the connection node between the second light-emitting control unit 132 and the light-emitting element 20 is the third connection node N3. The fifth energy storage module 400 is connected to the third connection node N3, and the fifth energy storage module 400 is normally on. That is, in the light-emitting stage of the first grayscale display frame and the light-emitting stage of the second grayscale display frame, the fifth energy storage module 400 is turned on. In this way, in the light-emitting stage of the low grayscale and the light-emitting stage of the high grayscale, the fifth energy storage module 400 stores part of the charge of the third node N3, further reducing the amount of charge flowing to the light-emitting element 20, making the response speed of the light-emitting element 20 slower, increasing the value span of the light-emitting element 20 at low grayscale and high grayscale, and improving the expansion capability of the light-emitting element 20.

It should be noted that FIG. 19 is just illustrative of the example in which the fifth energy storage module 400 is connected to the third connection node N3, but is not limited thereto. In some embodiments, the fifth energy storage module 400 may also be connected to the first node N1, and those skilled in the art may set it as needed.

Optionally, based on the above embodiments, referring to FIG. 19, the fifth energy storage module 400 includes a third capacitor C3, a first plate of the third capacitor C3 is connected to the second fixed potential signal terminal Vdd, and a second plate is connected to the anode of the light-emitting element 20. Specifically, the first plate of the third capacitor C3 is connected to the second fixed potential signal terminal Vdd, and the second plate is connected to the anode of the light-emitting element 20, thereby ensuring that the fifth energy storage module 400 is normally on, that is, ensuring that the third capacitor C3 stores part of the charge of the third node N3 in both the low grayscale light-emitting stage and the high grayscale light-emitting stage.

It should be noted that FIG. 19 is just illustrative of the example in which the first fixed potential signal terminal Vdc and the second fixed potential signal terminal Vdd are connected to different fixed potential signals, but is not limited thereto. In some embodiments, the first fixed potential signal terminal Vdc and the second fixed potential signal terminal Vdd may also be connected to the same fixed potential signal line, and those skilled in the art may set it as needed.

Figure 20:
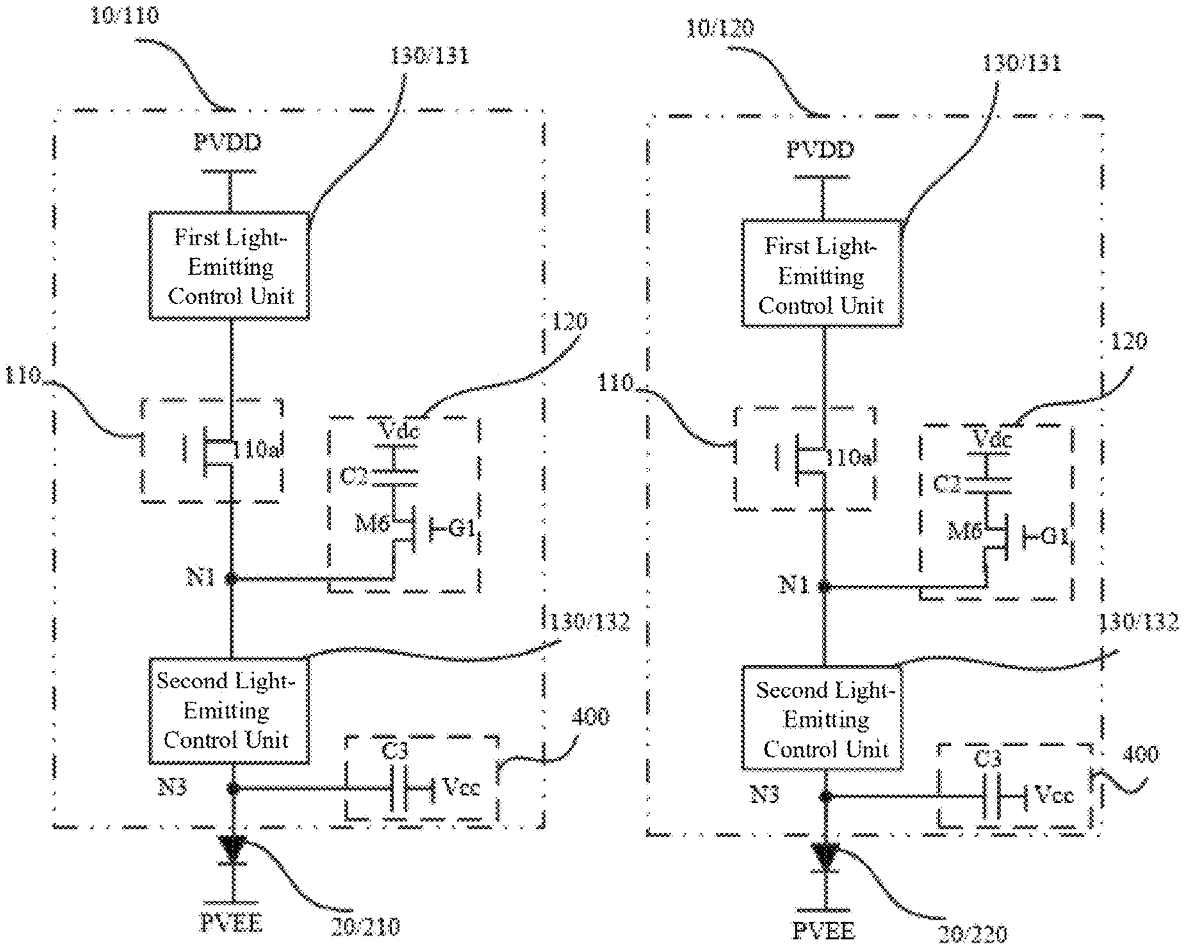
FIG. 20 is a schematic diagram of a circuit structure of another display panel, according to an embodiment of the present disclosure.

Optionally, based on the above embodiments, FIG. 20 is a schematic diagram of the circuit structure of another display panel, according to an embodiment of the present disclosure. Referring to FIG. 20, the pixel circuit 10 includes a first pixel circuit 101 and a second pixel circuit 102. The light-emitting element 20 includes a first light-emitting element 210 and a second light-emitting element 220. The first pixel circuit 101 is connected to the first light-emitting element 210, and the second pixel circuit 102 is connected to the second light-emitting element 220. The light-emitting color of the first light-emitting element 210 is different from the light-emitting color of the second light-emitting element 220. The capacitance value of the third capacitor C3 in the first pixel circuit 101 is different from that of the third capacitor C3 in the second pixel circuit 102.

Specifically, when the response speed of the light-emitting element 20 is adjusted by the fifth energy storage module 400, the capacitance value of the third capacitor C3 in the fifth energy storage module 400 affects the degree of adjustment of the response speed of the light-emitting element 20 by the fifth energy storage module 400. For example, if the capacitance value of the third capacitor C3 in the fifth energy storage module 400 is larger, the fifth energy storage module 400 may store more charge, so that the degree of reduction in the response speed of the light-emitting element 20 is larger. If the capacitance value of the third capacitor C3 in the fifth energy storage module 400 is smaller, the fifth energy storage module 400 may store less charge, so that the degree of reduction in the response speed of the light-emitting element 20 is smaller. Furthermore, in the embodiments of the present disclosure, on the basis of setting the fifth energy storage module 400 to adjust the response speed of the light-emitting element 20, the capacitance value of the capacitor in the fifth energy storage module 400 of the first pixel circuit 101 is different from that of the capacitor in the fifth energy storage module 400 in the second pixel circuit 102. That is, the light-emitting element 20 with a larger self-capacitance value reduces the response speed at a smaller degree through the third capacitor C3 with a smaller capacitance value, and the light-emitting element 20 with a smaller self-capacitance value reduces the response speed at a larger degree through the third capacitor C2 with a larger capacitance value, thereby reducing the difference in response speed between the first light-emitting element 210 and the second light-emitting element 220, ameliorating the ghosting phenomenon, and enhancing the display effect of the display panel.

It should be noted that when the pixel circuit 10 includes both the first energy storage module 120 and the fifth energy storage module 400, the capacitance value of the third capacitor C3 in the first pixel circuit 101 and the third capacitor C3 in the second pixel circuit 102 may also be set to be different, and the capacitance value of the second capacitor C2 in the first pixel circuit 101 and the second capacitor C2 in the second pixel circuit 102 may be different. That is, the first energy storage module 120 and the fifth energy storage module 400 are combined to jointly reduce the response speed difference between the first light-emitting element 210 and the second light-emitting element 220.

Optionally, based on the above embodiments, referring to FIG. 20, the self-capacitance value of the first light-emitting element 210 is greater than the self-capacitance value of the second light-emitting element 220. The capacitance value of the third capacitor C3 in the first pixel circuit 101 is less than the capacitance value of the third capacitor C3 in the second pixel circuit 102.

Specifically, the self-capacitance value of the first light-emitting element 210 is greater than the self-capacitance value of the second light-emitting element 220, that is, the response speed of the first light-emitting element 210 when lit is slower, and the response speed of the second light-emitting element 220 when lit is faster. Accordingly, the capacitance value of the third capacitor C3 in the fifth energy storage module 400 of the first pixel circuit 101 may be set to be smaller than the capacitance value of the third capacitor C3 in the fifth energy storage module 400 in the second pixel circuit 102. That is, the first light-emitting element 210 with a slower response speed reduces the response speed at a smaller degree through the third capacitor C3 with a smaller capacitance value, and the second light-emitting element 220 with a faster response speed reduces the response speed at a larger degree through the third capacitor C3 with a larger capacitance value, thereby reducing the difference in response speed between the first light-emitting element 210 and the second light-emitting element 220, ameliorating the ghosting phenomenon, and enhancing the display effect of the display panel.

Figure 21:
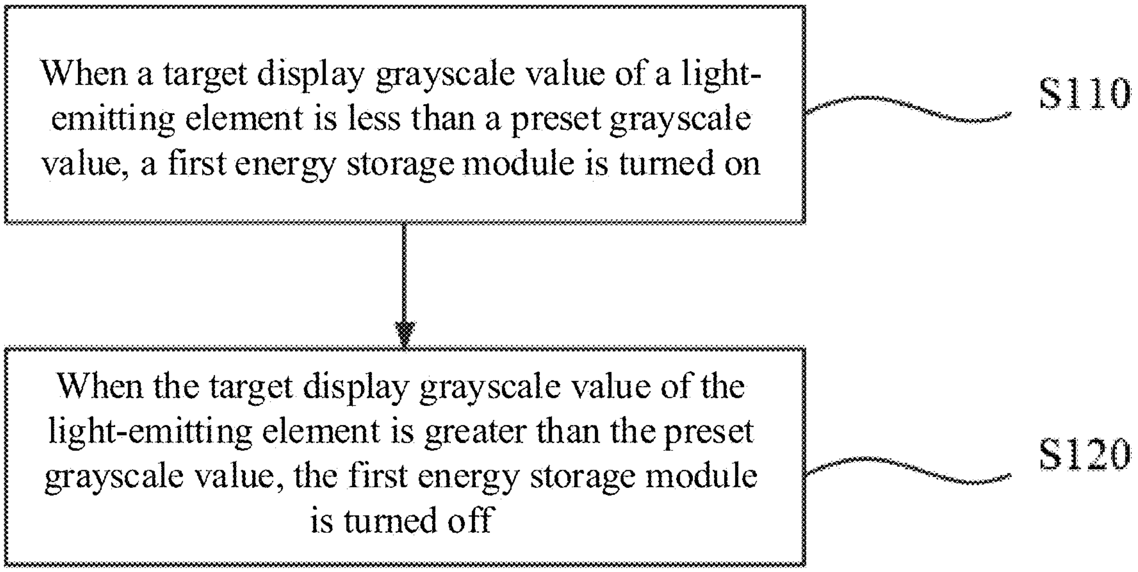
FIG. 21 is a flow chart of a method for driving a display panel, according to an embodiment of the present disclosure.

Based on the above inventive concepts, an embodiment of the present disclosure further provides a method for driving a display panel. FIG. 21 is a flow chart of a method for driving a display panel, according to an embodiment of the present disclosure. Referring to FIG. 21, the driving method includes:

S110: When a target display grayscale value of a light-emitting element is less than a preset grayscale value, a first energy storage module is turned on.

Specifically, as shown in FIG. 1 and FIG. 21, the pixel circuit 10 is electrically connected to the light-emitting element 20. The pixel driving circuit 10 provides a driving signal to the light-emitting element 20 to drive the light-emitting element 20 to emit light. The display panel includes a first power signal terminal PVDD and a second power signal terminal PVEE, the first power signal terminal PVDD may be a positive power signal terminal, and the second power signal terminal PVEE may be a negative power signal terminal. The pixel circuit 10 includes a driving module 110. A driving transistor 110*a* and the light-emitting element 20 are connected in series between the first power signal terminal PVDD and the second power signal terminal PVEE to form a first series branch. Under the action of the first power signal terminal PVDD, the driving module 110 controls the current or voltage flowing through the light-emitting element 20 according to the data signal input to the driving module 110, thereby controlling the light-emitting brightness of the light-emitting element 20, and realizing different grayscale display of the display panel.

In addition, during the display process of the display panel, the light-emitting element 20 has different display grayscales, where the display grayscale may be understood as the brightness level of the light-emitting element 20, that is, different brightness levels from the darkest to the brightest. Exemplarily, the display grayscale of the light-emitting element 20 may be divided into low grayscale and high grayscale, where the low grayscale may correspond to a darker light-emitting brightness, and the high grayscale corresponds to a brighter light-emitting brightness. In some embodiments, the display grayscale may be represented by a numerical value, such as a display grayscale value of 0-255, where the display grayscale value of 0 indicates that the light-emitting brightness of the light-emitting element 20 is the darkest, and the display grayscale value of 255 indicates that the light-emitting brightness of the light-emitting element 20 is the brightest. At this moment, the low grayscale may be a display grayscale with a display grayscale value close to 0, and the high grayscale may be a display grayscale with a display grayscale value close to 255. In the display panel of the existing technologies, a light-emitting element 20 has the problem of fast charging speed at low grayscale. Since the driving voltage provided by the driving module to the light-emitting element at low grayscale is small and the range of the driving voltage is small, the numerical span of the grayscale at low grayscale is small, that is, the difference between adjacent grayscales is not obvious and the expansion is not sufficient, resulting in unclear layers during display and details are easily lost.

To this end, the embodiments of the present disclosure further provide a pixel circuit 10 to include a first energy storage module 120, and the first energy storage module 120 is connected to any connection node of the first series branch, and is configured to store energy during the lighting process of the light-emitting element 20. In addition, when the target display grayscale value of the light-emitting element 20 is less than a preset grayscale value, the display grayscale of the light-emitting element 20 is determined to be a low grayscale. When the target display grayscale value of the light-emitting element 20 is greater than the preset grayscale value, the display grayscale of the light-emitting element 20 is determined to be a high grayscale. Here, the target display grayscale value may be understood as the display grayscale value set for the light-emitting element 20. That is, the target display grayscale value is the set luminous brightness, rather than the current luminous brightness. Exemplarily, assuming the preset grayscale value is 128, the target display grayscale value of the light-emitting element 20 is a low grayscale when in the range of 0-127, and is a high grayscale when in the range of 129-255. In this way, when the target display grayscale value of the light-emitting element 20 is set to be less than the preset grayscale value (i.e., low grayscale), the first energy storage module 120 is turned on, so that the first energy storage module 120 stores part of the charge during the lighting process of the light-emitting element 20. This then reduces the amount of charge flowing to the light-emitting element 20, so that the response speed of the light-emitting element 20 is slower, thereby increasing the expansion capability of the low grayscale, that is, increasing the data span of the grayscale under the low grayscale. This then increases the difference between adjacent grayscales under the low grayscale, and reduces the risk of easy loss of display details under the low grayscale, thereby improving the display effect under the low grayscale.

S120: When the target display grayscale value of the light-emitting element is greater than the preset grayscale value, the first energy storage module is turned off.

Specifically, since the driving voltage provided by the driving transistor 110*a* to the light-emitting element 20 is relatively large and the range of the driving voltage is relatively large under high grayscale, the faster response speed of the light-emitting element 20 has less impact on the numerical span of the grayscale under high grayscale. In other words, the difference between adjacent grayscales under high grayscale is more obvious. Therefore, when the target display grayscale value of the light-emitting element 20 is greater than the preset grayscale value (i.e., high grayscale), the first energy storage module 120 is controlled to be turned off, thereby reducing the power consumption of the display panel.

In summary, in the embodiments of the present disclosure, the first energy storage module is set to turn on when the target display grayscale value of the light-emitting element is less than the preset grayscale value, and is set to turn off when the target display grayscale value of the light-emitting element is greater than the preset grayscale value. Thereby, the amount of charge flowing to the light-emitting element is reduced at low grayscale, so that the response speed of the light-emitting element is slower, and the expansion capability of the light-emitting element at low grayscale is increased. That is, the numerical span of the light-emitting element at low grayscale is increased, and the risk of easy loss of display details at low grayscale is reduced, and the display effect at low grayscale is improved. In addition, at high grayscale, since the driving voltage provided by the driving transistor to the light-emitting element is relatively large and the range of the driving voltage is relatively large, the response speed of the light-emitting element is relatively fast and has little effect on the numerical span of the grayscale at high grayscale. Therefore, when the target display grayscale value of the light-emitting element is greater than the preset grayscale value, it is not necessary to reduce the response speed of the light-emitting element, and the first energy storage module is controlled to be turned off, thereby reducing the power consumption of the display panel.

Figure 22:
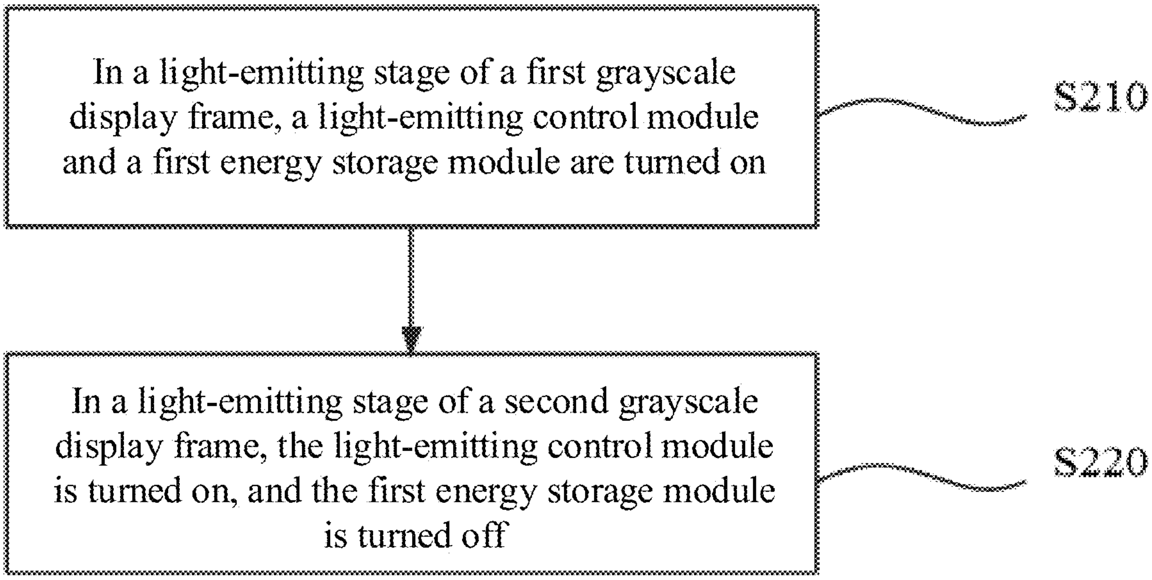
FIG. 22 is a flow chart of another method for driving a display panel, according to an embodiment of the present disclosure.

Optionally, FIG. 22 is a flow chart of another method for driving a display panel, according to an embodiment of the present disclosure. Referring to FIG. 22, the driving method includes:

S210: In a light-emitting stage of a first grayscale display frame, a light-emitting control module and a first energy storage module are turned on.

Specifically, referring to FIGS. 2, 3 and 22, the pixel circuit 10 also includes a light-emitting control module 130, and the display panel also includes a light-emitting control signal terminal, such as a first light-emitting control signal terminal EM1 and a second light-emitting control signal terminal EM2. The light-emitting control signal terminal is electrically connected to the control terminal of the light-emitting control module 130. The light-emitting control module 130, the driving transistor 110*a* and the light-emitting element 20 are connected in series between the first power signal terminal PVDD and the second power signal terminal PVEE. The light-emitting control signal transmitted to the light-emitting control module 130 through a light-emitting control line may control the circuit(s) between the first power signal terminal PVDD and the second power signal terminal PVEE to be turned on within a specified time period, so that the driving current of the driving transistor 110*a* flows into the light-emitting element 20. That is, the light-emitting control module 130 is configured to control the light-emitting duration of the light-emitting element 20 and ensure that the light-emitting element 20 emits light at the correct timing. In addition, the display panel may also include multiple scan signal terminals, and the multiple scan signal terminals may include a first scan signal terminal G1. The first scan signal terminal G1 may be electrically connected to the control terminal of the first energy storage module 120. The first scan signal provided by the first scan signal terminal G1 may be used to control the on and off of the first energy storage module 120.

In addition, the display process of the display panel includes multiple display frames. The multiple display frames include a first grayscale display frame S1 and a second grayscale display frame S2, where the first grayscale display frame S1 may be a low grayscale display frame, and the second grayscale display frame S2 may be a high grayscale display frame. In addition, a display frame also includes a light-emitting stage T1, that is, the lighting process of the light-emitting element 20, in which the light-emitting element 20 changes from non-light-emitting to light-emitting. Then, in the light-emitting stage T1 of the first grayscale display frame S, it is necessary to control the light-emitting control module 130 to be turned on through the light-emitting control signal terminal, so that the driving current of the driving transistor 110*a* may flow into the light-emitting element 20. In addition, the first scan signal terminal G1 controls the first energy storage module 120 to turn on, so that the first energy storage module 120 stores part of the charge to reduce the amount of charge flowing to the light-emitting element 20. Thus, the response speed of the light-emitting element 20 is slow, the numerical span of the light-emitting element 20 at low grayscale is increased, and the expansion capacity of the light-emitting element 20 at low grayscale is improved, thereby improving the display effect at low grayscale.

S220: In a light-emitting stage of a second grayscale display frame, the light-emitting control module is turned on, and the first energy storage module is turned off.

In the light-emitting stage T1 of the second grayscale display frame S2, on one hand, it is necessary to control the light-emitting control module 130 to be turned on through the light-emitting control signal terminal so that the driving current of the driving transistor 110*a* may flow into the light-emitting element 20. On the other hand, since the driving voltage provided by the driving transistor 110*a* to the light-emitting element 20 at high grayscale is large and the range of the driving voltage is large, the faster response speed of the light-emitting element 20 has little effect on the numerical span of the grayscale at high grayscale. In other words, the difference between adjacent grayscales at high grayscale is more obvious. Therefore, when the target display grayscale value of the light-emitting element 20 is greater than the preset grayscale value (i.e., high grayscale), the first energy storage module 120 is controlled to be turned off, thereby reducing the power consumption of the display panel.

Figure 23:
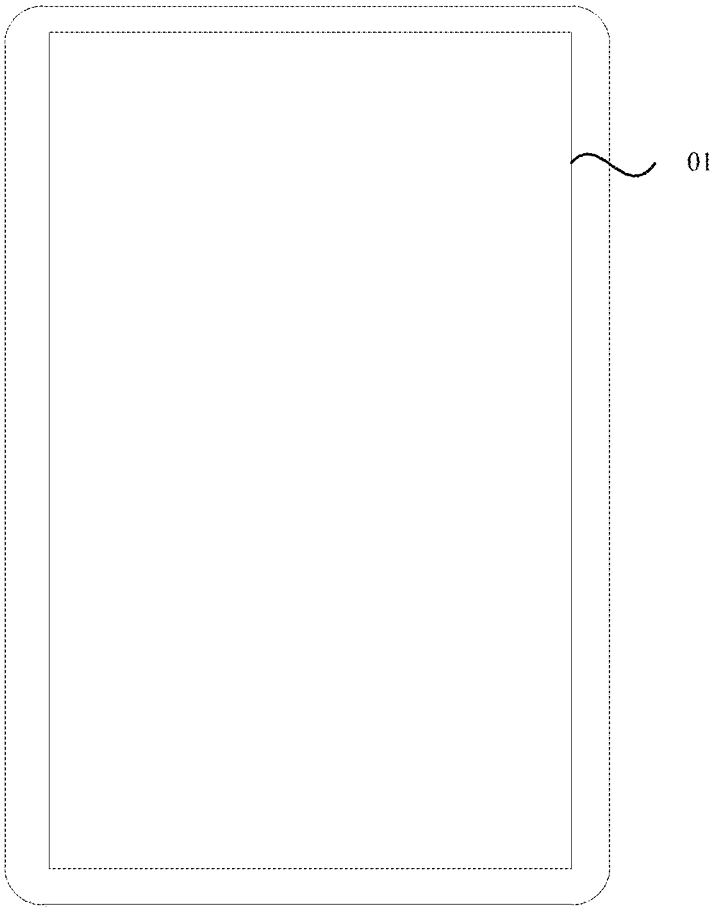
FIG. 23 is a schematic structural diagram of a display device, according to an embodiment of the present disclosure.

Based on the same inventive concepts, an embodiment of the present disclosure further provides a display device. FIG. 23 is a schematic structural diagram of a display device, according to an embodiment of the present disclosure. As shown in FIG. 23, the display device includes the display panel 01 in the above embodiments. The display device includes the display panel 01 of any embodiment of the present disclosure. Therefore, the display device provided by the embodiments of the present disclosure has the corresponding beneficial effects of the display panel 01 provided by the embodiments of the present disclosure, which will not be repeated here. Exemplarily, the display device may be an electronic device such as a mobile phone, a computer, a smart wearable device (e.g., a smart watch), and a vehicle-mounted display device, which is not limited by the embodiments of the present disclosure.

In the technical solutions of the present disclosure, the first energy storage module is connected to a connection node of the first series branch, and when the target display grayscale value of the light-emitting element is less than the preset grayscale value, that is, at low grayscale, the first energy storage module is controlled to be turned on. In this way, during the lighting process of the light-emitting element at low grayscale, part of the charge will flow to the first energy storage module, that is, the amount of charge flowing to the light-emitting element is reduced, so that the response speed of the light-emitting element is slowed down, the expansion capability of the low grayscale is increased, and the numerical span at low grayscale is increased, and the risk of easy loss of display details at low grayscale is reduced. In addition, since the driving voltage is large and the range of the driving voltage is large at high grayscale, the faster response speed of the light-emitting element has less effect on the numerical span of the grayscale at high grayscale. Therefore, when the target display grayscale value of the light-emitting element is greater than the preset grayscale value, that is, at high grayscale, there is no need to reduce the response speed of the light-emitting element, and then the first energy storage module is controlled to turn off, thereby reducing the power consumption of the display panel.

It should be noted that the above are just some embodiments of the present disclosure and the technical principles used. Those skilled in the art will understand that the present disclosure is not limited to the specific embodiments described herein, and that various obvious changes, readjustments and substitutions may be made by those skilled in the art without departing from the scope of protection of the present disclosure. Therefore, although the present disclosure has been described in specific details through the above embodiments, the present disclosure is not limited to the above embodiments, and may include additional equivalent embodiments without departing from the concept of the present disclosure, where the scope of the present disclosure is determined by the scope of the appended claims.

What is claimed is:

1. A display panel, comprising a pixel circuit and a light-emitting element, wherein:

the pixel circuit includes a driving module and a first energy storage module;

the driving module includes a driving transistor, the driving transistor and the light-emitting element are connected in series between a first power signal terminal and a second power signal terminal to form a first series branch, and the driving transistor is configured to drive the light-emitting element to emit light, and during a display process of the display panel, the light-emitting element has different display grayscales;

the first energy storage module is connected to a connection node of the first series branch; and the pixel circuit is configured as follows:

when a target display grayscale value of the light-emitting element is less than a preset grayscale value, the first energy storage module is turned on, and when the target display grayscale value of the light-emitting element is greater than the preset grayscale value, the first energy storage module is turned off.

2. The display panel according to claim 1, wherein:

the first energy storage module includes a second capacitor and a sixth transistor;

a first plate of the second capacitor is connected to a connection node between the driving transistor and the light-emitting element, a second plate of the second capacitor is connected to a first electrode of the sixth transistor, and a second electrode of the sixth transistor is connected to a first fixed potential signal terminal; or, the first electrode of the sixth transistor is connected to the connection node between the driving transistor and the light-emitting element, the second electrode of the sixth transistor is connected to the first plate of the second capacitor, and the second plate of the second capacitor is connected to the first fixed potential signal terminal; and the sixth transistor is configured to be turned on when the target display grayscale value of the light-emitting element is less than the preset grayscale value, and is configured to be turned off when the target display grayscale value of the light-emitting element is greater than the preset grayscale value.

3. The display panel according to claim 2, wherein:

the pixel circuit further includes a fifth energy storage module, and the fifth energy storage module is connected to a connection node between the driving transistor and the light-emitting element; and the fifth energy storage module is normally on and is configured to store energy during the lighting process of the light-emitting element.

4. The display panel according to claim 3, wherein the fifth energy storage module includes a third capacitor, a first plate of the third capacitor is connected to a second fixed potential signal terminal, and a second plate of the third capacitor is connected to an anode of the light-emitting element.

5. The display panel according to claim 4, wherein:

the pixel circuit includes a first pixel circuit and a second pixel circuit; the light-emitting element includes a first light-emitting element and a second light-emitting element;

the first pixel circuit is connected to the first light-emitting element, and the second pixel circuit is connected to the second light-emitting element; and a light-emitting color of the first light-emitting element is different from a light-emitting color of the second light-emitting element, a capacitance value of a third capacitor in the first pixel circuit is different from a capacitance value of a third capacitor in the second pixel circuit.

6. The display panel according to claim 5, wherein:

a self-capacitance value of the first light-emitting element is greater than a self-capacitance value of the second light-emitting element; and a capacitance value of the third capacitor in the first pixel circuit is smaller than a capacitance value of the third capacitor in the second pixel circuit.

7. The display panel according to claim 4, wherein the second fixed potential signal terminal and the first fixed potential signal terminal are connected to a same fixed potential signal line.

8. The display panel according to claim 2, wherein:

the pixel circuit includes a first pixel circuit and a second pixel circuit, and the light-emitting element includes a first light-emitting element and a second light-emitting element;

the first pixel circuit is connected to the first light-emitting element, and the second pixel circuit is connected to the second light-emitting element; and a light-emitting color of the first light-emitting element is different from a light-emitting color of the second light-emitting element, and a capacitance value of a second capacitor in the first pixel circuit is different from a capacitance value of a second capacitor in the second pixel circuit.

9. The display panel according to claim 8, wherein:

a self-capacitance value of the first light-emitting element is greater than a self-capacitance value of the second light-emitting element; and the capacitance value of the second capacitor in the first pixel circuit is smaller than the capacitance value of the second capacitor in the second pixel circuit.

10. The display panel according to claim 1, wherein:

the pixel circuit further includes a light-emitting control module, wherein the light-emitting control module, the driving transistor, and the light-emitting element are connected in series between the first power signal terminal and the second power signal terminal;

the display process of the display panel includes a plurality of display frames, the plurality of display frames include a first grayscale display frame and a second grayscale display frame, and a target display grayscale value of the light-emitting element in the first grayscale display frame is less than a target display grayscale value of the light-emitting element in the second grayscale display frame;

a display frame includes a light-emitting stage; and the pixel circuit is configured as follows:

in a light-emitting stage of the first grayscale display frame, the light-emitting control module and the first energy storage module are turned on, and in a light-emitting stage of the second grayscale display frame, the light-emitting control module is turned on, and the first energy storage module is turned off.

11. The display panel according to claim 10, wherein:

the light-emitting control module includes a first light-emitting control unit and a second light-emitting control unit;

the first light-emitting control unit, the driving transistor, the second light-emitting control unit and the light-emitting element are sequentially connected in series between the first power signal terminal and the second power signal terminal; and a connection node between the driving transistor and the second light-emitting control unit is a first node, and the first energy storage module is connected to the first node.

12. The display panel according to claim 11, wherein:

the pixel circuit further includes a reset compensation module, a data writing module and a second energy storage module;

the reset compensation module is connected between a gate reset signal terminal and a gate of the driving transistor;

the data writing module is connected between a data signal terminal and the gate of the driving transistor;

the second energy storage module is connected between the gate of the driving transistor and the first node;

the display frame further includes a threshold compensation stage and a data writing stage, the threshold compensation stage is located before the data writing stage, and the data writing stage is located before the light-emitting stage; and the pixel circuit is configured as follows:

in the threshold compensation stage, the reset compensation module, the first light-emitting control unit and the first energy storage module are turned on, and in the data writing stage, the data writing module and the first energy storage module are turned on.

13. The display panel according to claim 12, wherein:

the reset compensation module includes a first transistor, the data writing module includes a second transistor, and the second energy storage module includes a first capacitor;

a first electrode of the first transistor is connected to the gate reset signal terminal, and a second electrode of the first transistor is connected to the gate of the driving transistor;

a first electrode of the second transistor is connected to the data signal terminal, and a second electrode of the second transistor is connected to the gate of the driving transistor; and a first plate of the first capacitor is connected to the gate of the driving transistor, and a second plate of the first capacitor is connected to the first node.

14. The display panel according to claim 11, wherein:

a connection node between the first light-emitting control unit and the driving transistor is a second node, and a connection node between the second light-emitting control unit and the light-emitting element is a third node;

the pixel circuit further includes a third energy storage module, the third energy storage module is connected to the second node, and the pixel circuit is configured as follows: in the light-emitting stage of the first grayscale display frame, the third energy storage module is turned on, and in the light-emitting stage of the second grayscale display frame, the light-emitting control module is turned on and the third energy storage module is turned off; and/or, the pixel circuit further includes a fourth energy storage module, the fourth energy storage module is connected to the third node, and the pixel circuit is configured as follows: in the light-emitting stage of the first grayscale display frame, the fourth energy storage module is turned on, and in the light-emitting stage of the second grayscale display frame, the light-emitting control module is turned on and the fourth energy storage module is turned off.

15. The display panel according to claim 14, wherein each of the first energy storage module, the third energy storage module and the fourth energy storage module includes a capacitor and a switching transistor, the capacitor and the switching transistor are connected in series to form a second series branch, and two ends of the second series branch are respectively connected to a first fixed potential signal terminal and the connection node of the first series branch.

16. The display panel according to claim 11, wherein:

the pixel circuit further includes a reset module, a threshold compensation module, a data writing module and a second energy storage module;

a connection node between the first light-emitting control unit and the driving transistor is a second node, and a connection node between the second light-emitting control unit and the light-emitting element is a third node;

the threshold compensation module is connected between the second node and a gate of the driving transistor;

the second energy storage module is connected between the gate of the driving transistor and the third node;

the reset module is connected between a gate reset signal terminal and the third node;

the data writing module is connected between a data signal terminal and the first node;

the display frame further includes a reset stage and a data writing stage; and the pixel circuit is configured as follows:

in the reset stage, the reset module is turned on, and in the data writing stage, the data writing module, the threshold compensation module and the reset module are all turned on.

17. The display panel according to claim 10, wherein:

a connection node between the first light-emitting control unit and the driving transistor is a second node, and a connection node between the second light-emitting control unit and the light-emitting element is a third node; and the first energy storage module is connected to the second node or the third node.

18. The display panel according to claim 1, wherein:

when the first energy storage module is turned on, the light-emitting element is lit at a first response speed; and when the first energy storage module is turned off, the light-emitting element is lit at a second response speed, wherein the first response speed is smaller than the second response speed.

19. A method for driving a display panel, wherein the display panel includes a pixel circuit and a light-emitting element, the pixel circuit includes a driving module and a first energy storage module, the driving module includes a driving transistor, the driving transistor and the light-emitting element are connected in series between a first power signal terminal and a second power signal terminal to form a first series branch, the driving transistor is configured to drive the light-emitting element to emit light, during a display process of the display panel, the light-emitting element has different display grayscales, and the first energy storage module is connected to a connection node of the first series branch, and the driving method comprises:

when a target display grayscale value of the light-emitting element is less than a preset grayscale value, turning on the first energy storage module; and when the target display grayscale value of the light-emitting element is greater than the preset grayscale value, turning off the first energy storage module.

20. The driving method according to claim 19, wherein:

the pixel circuit further includes a light-emitting control module, and the light-emitting control module is connected in series with the driving transistor and the light-emitting element between a first power signal terminal and a second power signal terminal;

the display process of the display panel includes a plurality of display frames, the plurality of display frames include a first grayscale display frame and a second grayscale display frame, and a target display grayscale value of the light-emitting element in the first grayscale display frame is less than a target display grayscale value of the light-emitting element in the second grayscale display frame;

a display frame includes a light-emitting stage;

when the target display grayscale value of the light-emitting element is less than the preset grayscale value, turning on the first energy storage module includes: in a light-emitting stage of the first grayscale display frame, turning on the light-emitting control module and the first energy storage module; and when the target display grayscale value of the light-emitting element is greater than the preset grayscale value, turning off the first energy storage module includes: in a light-emitting stage of the second grayscale display frame, turning on the light-emitting control module, and turning off the first energy storage module.

21. A display device, comprising a display panel, the display panel including a pixel circuit and a light-emitting element, wherein:

the pixel circuit includes a driving module and a first energy storage module;

the driving module includes a driving transistor, the driving transistor and the light-emitting element are connected in series between a first power signal terminal and a second power signal terminal to form a first series branch, and the driving transistor is configured to drive the light-emitting element to emit light, and during a display process of the display panel, the light-emitting element has different display grayscales;

the first energy storage module is connected to a connection node of the first series branch; and the pixel circuit is configured as follows:

when a target display grayscale value of the light-emitting element is less than a preset grayscale value, the first energy storage module is turned on, and when the target display grayscale value of the light-emitting element is greater than the preset grayscale value, the first energy storage module is turned off.

* * * * *